(12) United States Patent
Iwata et al.

(10) Patent No.: US 12,077,377 B2
(45) Date of Patent: Sep. 3, 2024

(54) TRANSPORT VEHICLE

(71) Applicant: Daifuku Co., Ltd., Osaka (JP)

(72) Inventors: Masashige Iwata, Hinocho (JP);
Kazunari Kimura, Hinocho (JP);
Hiroyoshi Murata, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 23 days.

(21) Appl. No.: 17/742,460

(22) Filed: May 12, 2022

(65) Prior Publication Data

US 2022/0363475 A1 Nov. 17, 2022

(30) Foreign Application Priority Data

May 13, 2021 (JP) .................................. 2021-081806

(51) Int. Cl.
*B65G 1/04* (2006.01)
*B60P 1/64* (2006.01)

(52) U.S. Cl.
CPC .......... *B65G 1/0407* (2013.01); *B60P 1/6418* (2013.01)

(58) Field of Classification Search
CPC .... B65G 1/0492; B65G 1/0407; B60P 1/6418
See application file for complete search history.

(56) References Cited

U.S. PATENT DOCUMENTS

| | | | |
|---|---|---|---|
| 2006/0291992 A1* | 12/2006 | Tsujimoto | B65G 1/0407 414/807 |
| 2017/0334643 A1* | 11/2017 | Itoh | B65G 1/0492 |
| 2018/0099811 A1* | 4/2018 | Shen | B66F 3/08 |
| 2020/0198946 A1* | 6/2020 | Chow | B65G 1/0492 |
| 2021/0147147 A1* | 5/2021 | Durai | B65G 1/06 |
| 2021/0178953 A1 | 6/2021 | Odawara et al. | |
| 2021/0395007 A1* | 12/2021 | Galluzzo | B65G 1/0407 |
| 2021/0395014 A1* | 12/2021 | Chen | B25J 9/1664 |

FOREIGN PATENT DOCUMENTS

| | | | | |
|---|---|---|---|---|
| JP | 5481994 B2 | 4/2014 | | |
| WO | 2020049960 A1 | 3/2020 | | |
| WO | WO-2020049960 A1 * | 3/2020 | ............... | B60P 1/02 |

\* cited by examiner

*Primary Examiner* — Kaitlin S Joerger

(74) *Attorney, Agent, or Firm* — The Webb Law Firm

(57) ABSTRACT

A pair of drive wheels are disposed in a middle region of a travel body section in a body length direction and are separated from each other in a body width direction. A first drive source is disposed on a first side in the body length direction relative to a width direction reference line and a first side in a body width direction relative to a length direction reference line in top-down view. A second drive source is disposed on a second side in the body length direction relative to the width direction reference line and a second side in the body width direction relative to the length direction reference line in top-down view.

11 Claims, 14 Drawing Sheets

TRANSPORT VEHICLE

CROSS-REFERENCE TO RELATED APPLICATION

This application claims priority to Japanese Patent Application No. 2021-081806 filed May 13, 2021, the disclosure of which is hereby incorporated by reference in its entirety.

BACKGROUND OF THE INVENTION

1. Field of the Invention

The present invention relates to a transport vehicle that transports articles in a supported state and the transfers the articles to a transfer target location.

2. Description of the Related Art

Heretofore, various measures have been taken in technical fields such as the above in order to realize smooth travel, direction change and the like of transport vehicles.

For example, in the technology disclosed in Japanese Patent No. 5481994 (Patent Document 1), a body (11) of a transport vehicle (10) is provided with a pair of drive wheels (12, 13) and a pair of caster wheels (14, 15). One caster wheel (14) of the pair of caster wheels (14, 15) is provided with a cushion mechanism and is movable vertically, the other caster wheel (15) is fixed to be immovable vertically, and a battery (18), which is a heavy load, is disposed inside a triangle formed by the pair of drive wheels (12, 13) and the fixed caster wheel (15) in top-down view. The technology of Patent Document 1 thereby realizes smooth travel, direction change and the like of the transport vehicle (10) by facilitating keeping the drive wheels (12, 13) grounded and reducing resistance on the caster wheels (14, 15) when the transport vehicle (10) is turning, even when the body (11) is inclined due to a heavy load. Note that the reference signs shown in parentheses above are those of Patent Document 1.

SUMMARY OF THE INVENTION

Incidentally, a transport vehicle for transporting articles in a supported state and transferring the articles such as described above includes functional sections for supporting and transferring articles. A drive source for driving the functional sections tends to be a comparatively heavy load among the members constituting the transport vehicle. By giving consideration to the disposition position of such a drive source, improvement in the weight balance of the transport vehicle can be expected, and, consequently, stabilization of the behavior of the transport vehicle when the transport vehicle is turning in order to change direction or the like can be expected.

In view of the above circumstances, it is desired to realize a technology that enables the behavior of a transport vehicle when performing a turn to be stabilized.

A transport vehicle for transporting an article in a supported state and transferring the article to a transfer target location includes:
 a travel body configured to travel;
 a functional section configured to support and transfer the article; and
 a first drive source and a second drive source configured to drive the functional section,
 wherein the travel body includes:
 a travel body section;
 a pair of drive wheels supported by the travel body section; and
 a wheel drive source configured to drive the pair of drive wheels,
 the pair of drive wheels are drivable by the wheel drive source to rotate at identical speeds or different speeds to each other,
 the pair of drive wheels are disposed in a middle region of the travel body section in a length direction of a body of the transport vehicle that is a direction in which the travel body travels, and are separated from each other in a width direction of the body that is a direction intersecting the length direction of the body in top-down view extending vertically,
 the first drive source is disposed, in top-down view, on a first side in the length direction of the body relative to a width direction reference line and on a first side in the width direction of the body relative to a length direction reference line, the first side in the length direction of the body being one side in the length direction of the body, and the first side in the width direction of the body being one side in the width direction of the body, and
 the second drive source is disposed, in top-down view, on a second side in the length direction of the body relative to the width direction reference line and on a second side in the width direction of the body relative to the length direction reference line, the second side in the length direction of the body being another side in the length direction of the body, and the second side in the width direction of the body being another side in the width direction of the body,
 the width direction reference line being a virtual line extending in the width direction of the body to connect the pair of drive wheels in top-down view, and the length direction reference line being a virtual line intersecting the width direction reference line in top-down view at an intermediate position between the pair of drive wheels in the width direction of the body and extending in the length direction of the body.

According to this configuration, a so-called spin turn in which the travel body is made to turn on the spot can be performed by rotating the pair of drive wheels in opposite directions. However, when performing such a spin turn, the behavior of the transport vehicle could possibly be destabilized if the center of gravity of the transport vehicle is greatly biased in the length direction of the body and the width direction of the body. Here, the point where the width direction reference line and the length direction reference line intersect in top-down view roughly coincides with the turning center that the travel body turns around when the transport vehicle performs a spin turn. According to this configuration, the first drive source and the second drive source, which tend to be heavy loads, are disposed diagonally in top-down view, with respect to the turning center of the travel body. Thus, ensuring that the center of gravity of the transport vehicle is not greatly biased in the length direction of the body and the width direction of the body is facilitated. Accordingly, with this configuration, it becomes possible to stabilize the behavior of the transport vehicle when performing a turn including a spin turn.

Other features and advantages of the technology related to the disclosure will become clear from the following description of illustrative and nonlimiting embodiments with reference to the drawings.

BRIEF DESCRIPTION OF THE DRAWINGS

FIG. 2 is a plan view showing regions that a travel body travels through.

DETAILED DESCRIPTION OF PREFERRED EMBODIMENTS

A transport vehicle transports articles in a supported state and transfers the articles to a transfer target location. Hereinafter, embodiments of the transport vehicle will be described, taking as an example the case where the transport vehicle is provided in a transport facility that transporting containers. That is, in the present embodiment, a container corresponds to an "article". The transport vehicle transports containers in a supported state and transfers the containers to a transfer target location.

First Embodiment

First, a first embodiment of the transport vehicle will be described.

Figure 1:
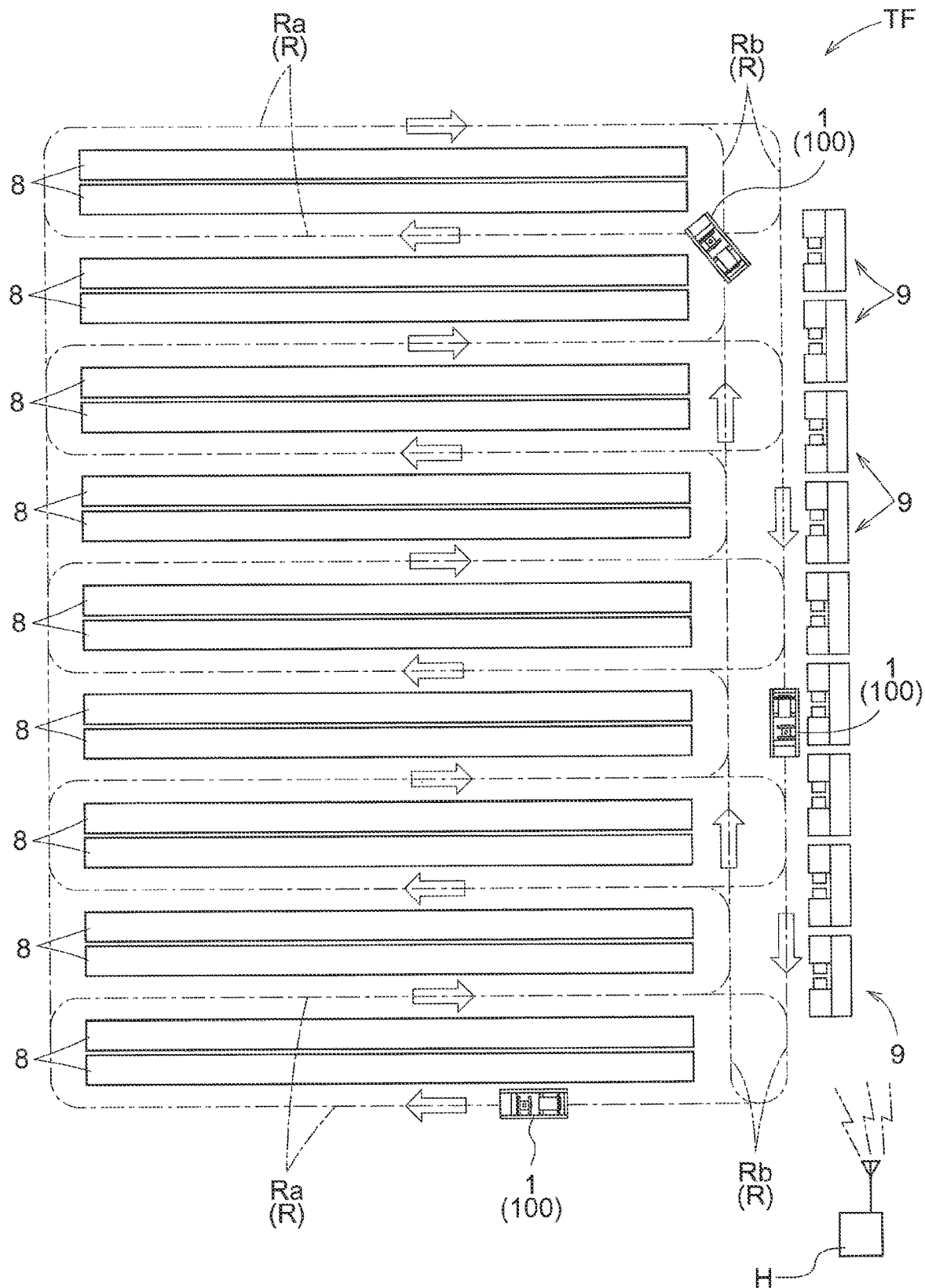
FIG. 1 is a plan view of a transport facility including a transport vehicle.

As shown in FIG. 1, a transport facility TF includes a container rack 8 for storing containers 70 (see FIG. 3), a carry in/out section 9 for carrying containers 70 in and out, and a host controller H for managing the entire facility. A transport vehicle 100 transports containers 70 carried in by the carry in/out section 9 to the container rack 8, or transports containers 70 stored in the container rack 8 to the carry in/out section 9 for carrying out.

In the present embodiment, a plurality of container racks 8 are disposed parallel to each other at a predetermined interval. Each of the container racks 8 is open at least at the front, and the containers 70 are taken in and out from the front of the container racks 8. Part of a travel path R of a travel body 1 (transport vehicle 100) is set between pairs of adjacent container racks 8 that face each other from the front. In other words, adjacent container racks 8 forming a pair are spaced apart parallel to each other, and part of the travel path R passes between the pair of container racks 8. The outermost container racks 8 of the plurality of container racks 8 provided in the transport facility TF face outward from the front, and part of the travel path R is also set in the region along the front of these outermost container racks 8. Furthermore, the transport facility TF is provided with a plurality of carry in/out sections 9, and part of the travel path R is also set in the region passing by each of the carry in/out sections 9.

The travel path R includes an inner path Ra extending along the front of each container rack 8 in the direction in which the container rack 8 extends and an outer path Rb set outside the region in which the container racks 8 are disposed. The inner path Ra is set in correspondence with each of the container racks 8. In the present embodiment, the parts of the travel path R set in the region between pairs of adjacent container racks 8 that face each other from the front and the parts of the travel path R set in the region along the front of the container racks 8 facing outward from the front correspond to the inner paths Ra. The outer paths Rb are set to link the inner paths Ra. The outer paths Rb are also set to pass by each of the carry in/out sections 9. In the present embodiment, the portion of the travel path R other than the inner paths Ra corresponds to the outer paths Rb.

Figure 2:
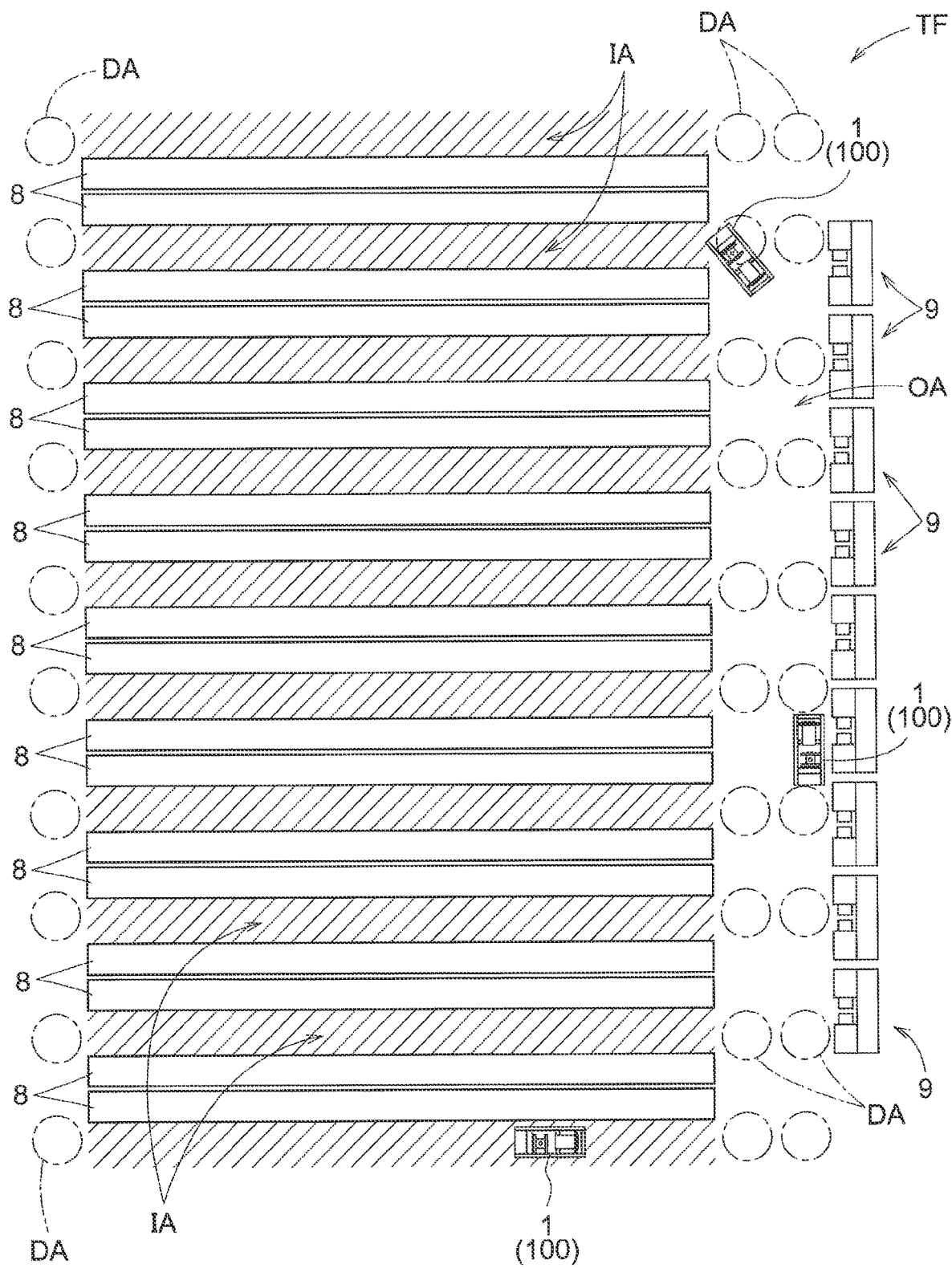

As shown in FIG. 2, a rack region IA and an external region OA in which the travel body 1 travels are set in the transport facility TF. In the present embodiment, a direction change region DA is further set in the transport facility TF.

The rack region IA is a region set along the front of each container rack 8. The entirety of the rack region IA opposes the front of the container rack 8 corresponding to that rack region IA. In other words, each rack region IA extends along the front of the container rack 8 corresponding to that rack region IA in the direction in which the container rack 8 extends. The dimensions of the rack region IA in the extension direction are equal to the dimensions of the container rack 8 in the extension direction.

The rack region IA is the region through which the inner path Ra (see FIG. 1) passes, and the region where the travel body 1 traveling on the inner path Ra opposes the front of the container rack 8. In the present embodiment, the rack region IA is set in the region between pairs of adjacent container racks 8 that face each other from the front. The rack region IA is also set in the region along the front of the outermost container racks 8 of the plurality of container racks 8 provided in the transport facility TF.

The external region OA is the region within the transport facility TF other than the rack regions IA. The external region OA is the region through which the outer paths Rb pass. In the present embodiment, the direction change region DA is set at a plurality of locations in the external region OA. The direction change region DA is a region for the travel body 1 to change the movement direction (direction change). Some of the direction change regions DA are set in places where a plurality of travel paths R (outer paths Rb) intersect. While a detailed description will be given later, the travel body 1 according to the present embodiment changes the movement direction, by rotating on the spot around the axis extending vertically in the direction change region DA.

Container Rack

Figure 3:
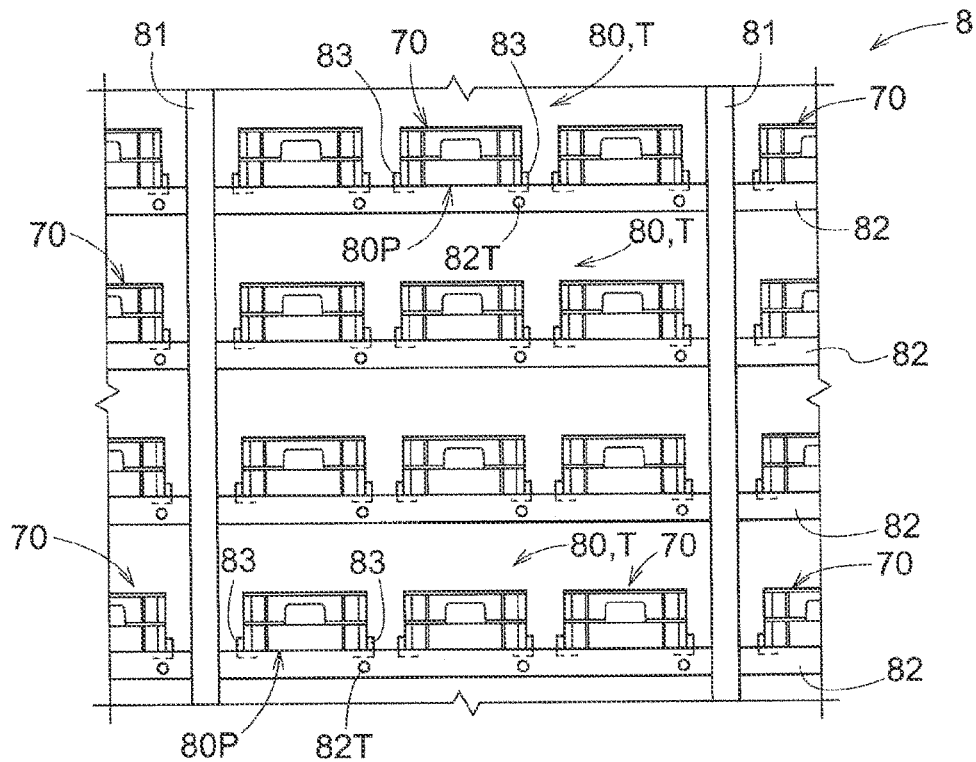
FIG. 3 is a front view of a container rack.

As shown in FIG. 3, the container rack 8 is provided vertically with a plurality of rack sections 80 for storing containers 70. In the present embodiment, each container rack 8 includes a plurality of beam members 82 extending horizontally along the front of the container rack 8, and a plurality of strut members 81 extending vertically and coupled to the beam members 82. That is, the container rack 8 includes a support frame combining the support members 81 and the beam members 82.

The beam members 82 are separated from each other vertically. Placement members 83 for placing a container 70 on are coupled to each of the beam members 82. In the present example, a container 70 is stored in the rack section 80, by being placed on a pair of placement members 83. Also, plural pairs of placement members 83 are disposed in the rack sections 80, and a plurality of containers 70 can be stored in one rack section 80. Note that, in the present example, the region between a pair of strut members 81 adjacent in the width direction (left-right direction) and between a pair of beam members 82 adjacent in the vertical direction in the front view shown in FIG. 3 corresponds to an opening of the container rack 8.

In the present embodiment, at a reference position 80P for storing a container 70 in the rack section 80, a target section 82T serving as a target for storing the container 70 at the reference position 80P is provided. In the present example, the target section 82T is provided to the beam member 82. The target section 82T is provided one for each pair of placement members 83. In the illustrated example, the target section 82T is a hole formed in the beam member 82.

Container

The container 70 is the object of transportation by the transport vehicle 100. Although not illustrated in detail, the container 70 is formed in a box shape having an open section that is open upward. In the present example, the outer shape of the container in top-down view is rectangular. A predetermined storage item can be stored inside the container 70. The storage item includes, for example, various products such as foodstuff or household items, or items such as components or in-process goods to be used on a factory production line or the like. As described above, in the present embodiment, the container 70 corresponds to an "article". That is, in the present embodiment, the article is the container 70 in which items for storage are storable.

In the present embodiment, the container 70 is stackable on another container 70 with the storage item stored therein. That is, the containers 70 are vertically stackable (see FIG. 4). In the present example, two containers 70 are vertically stacked, by the bottom of one container 70 fitting into the open section of the other container 70 from above.

Transport Vehicle

Figure 4:
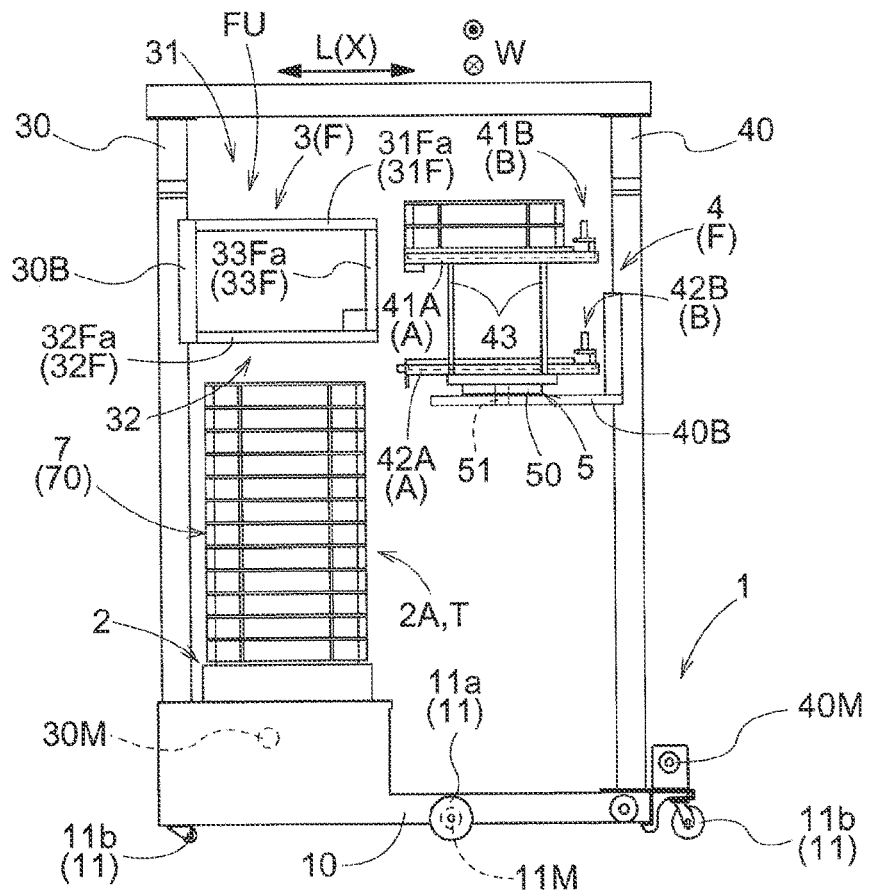
FIG. 4 is a view of the transport vehicle in a body width direction.

As shown in FIG. 4, the transport vehicle 100 includes the travel body 1 that travels and functional sections F for supporting and transferring containers 70. The travel body 1 travels along the predetermined travel path R (see FIG. 1). In the present embodiment, the transport vehicle 100 includes a container group support 2 for supporting a plurality of containers 70 within a predetermined stacking region 2A as a stacked container group 7, a lifting device 3 serving as a functional section F for lifting the containers 70 of the container group 7 supported by the container group support 2, and a transfer device 4 serving as a functional section F for transferring the containers 70. In the present embodiment, the transport vehicle 100 further includes a controller C (see FIG. 6) for controlling the travel body 1, the lifting device 3 and the transfer device 4. The controller C also additionally controls the container group support 2.

The container group support 2, the lifting device 3 and the transfer device 4 are mounted on the travel body 1. The container group support 2 and the transfer device 4 are disposed side by side in a body length direction L on the travel body 1, where the body length direction L is the direction in which the travel body 1 travels. Note that, hereinafter, the direction orthogonal to the body length direction L in top-down view extending vertically is given as "body width direction W".

Travel Body

The travel body 1 travels on the predetermined travel path R (see FIG. 1), and is capable of traveling through the rack regions IA and the external region OA (see FIG. 2). In the present embodiment, the travel body 1 travels on the inner paths Ra and the outer path Rb. The travel body 1 is in the rack region IA when traveling or stopped on the inner path Ra, and is in the external region OA when traveling or stopped on the outer path Rb. When the travel body 1 is on the boundary between the rack region IA and the external region OA, part of the travel body 1 will be in the rack region IA, and the remaining part of the travel body 1 will be in the external region OA. In the present embodiment, the travel body 1 travels on a floor surface.

The travel body 1 includes a travel body section 10, a plurality of travel wheels 11 supported by the travel body section 10, and a wheel drive source 11M that drives the travel wheels 11. The wheel drive source 11M includes a motor (not shown). A propulsion force is applied to the travel body 1, due to the wheel drive source 11M driving some of the travel wheels 11.

Container Group Support

The container group support 2 is mounted on the travel body 1. The container group support 2 is capable of supporting a plurality of containers 70 as a stacked container group 7. The stacking region 2A in which the container group 7 is disposed is defined upward of the container group support 2. The stacking region 2A is a three-dimensional virtual region extending upward from the container group support 2. In the present example, the container group support 2 is a conveyor capable of moving a container group 7 with the container group 7 placed thereon. In the present example, the container group support 2 is capable of moving the container group 7 in the body width direction W. The conveyor constituting the container group support 2 may be a known conveyor such as a roller conveyor, chain conveyor or belt conveyor.

The carry in/out section 9 (see FIGS. 1 and 2) carries in a container group 7 in which a plurality of containers 70 are stacked. With the travel body 1 adjacent to the carry in/out section 9, the container group support 2 receives a container group 7 from the carry in/out section 9 or delivers a container group 7 to the carry in/out section 9. That is, the container group support 2 receives and delivers container groups 7 from and to the carry in/out section 9. Although not illustrated in detail, in the present example, the carry in/out section 9 is adjacent to a picking area where removal of storage items such as products from the containers 70 is performed. When a container group 7 is delivered from the container group support 2 to the carry in/out section 9, the storage items are removed the containers 70 in the picking area adjacent to the carry in/out section 9. After some or all of the storage items stored in a container 70 are removed, the container 70 is delivered from the carry in/out section 9 to the container group support 2 (transport vehicle 100) and transported to the container rack 8 again. The carry in/out section 9 need not, however, be adjacent to the picking area, and may be adjacent to another facility or work area. Also, the carry in/out section 9 may, for example, be configured to transport a container group 7 delivered from the container group support 2 to outside the transport facility TF.

Lifting Device

The lifting device 3 serving as a functional section F is mounted on the travel body 1. The lifting device 3 lifts the containers 70 of the container group 7 supported by the container group support 2, or in other words, the containers 70 of the container group 7 disposed in the stacking region 2A. Also, the lifting device 3 is capable of horizontally supporting the container group 7 disposed in the stacking region 2A.

The lifting device 3 includes a lifting mast 30 standing upward from the travel body 1, a lift elevating body 30B coupled to the lifting mast 30, and a lift elevating body drive section 30M for elevating the lift elevating body 30B up and down along the lifting mast 30. Although not illustrated in detail, the lift elevating body drive section 30M is a motor for rotationally driving a rotary body around which an endless body such as a belt is wound.

In the present embodiment, the lift elevating body drive section 30M is the drive source of the lifting device 3 serving as a functional section F. Here, the lift elevating body drive section 30M corresponds to a "first drive source". That is, the transport vehicle 100 is provided with a first drive source (lift elevating body drive section 30M) for driving this functional section F.

Figure 9:
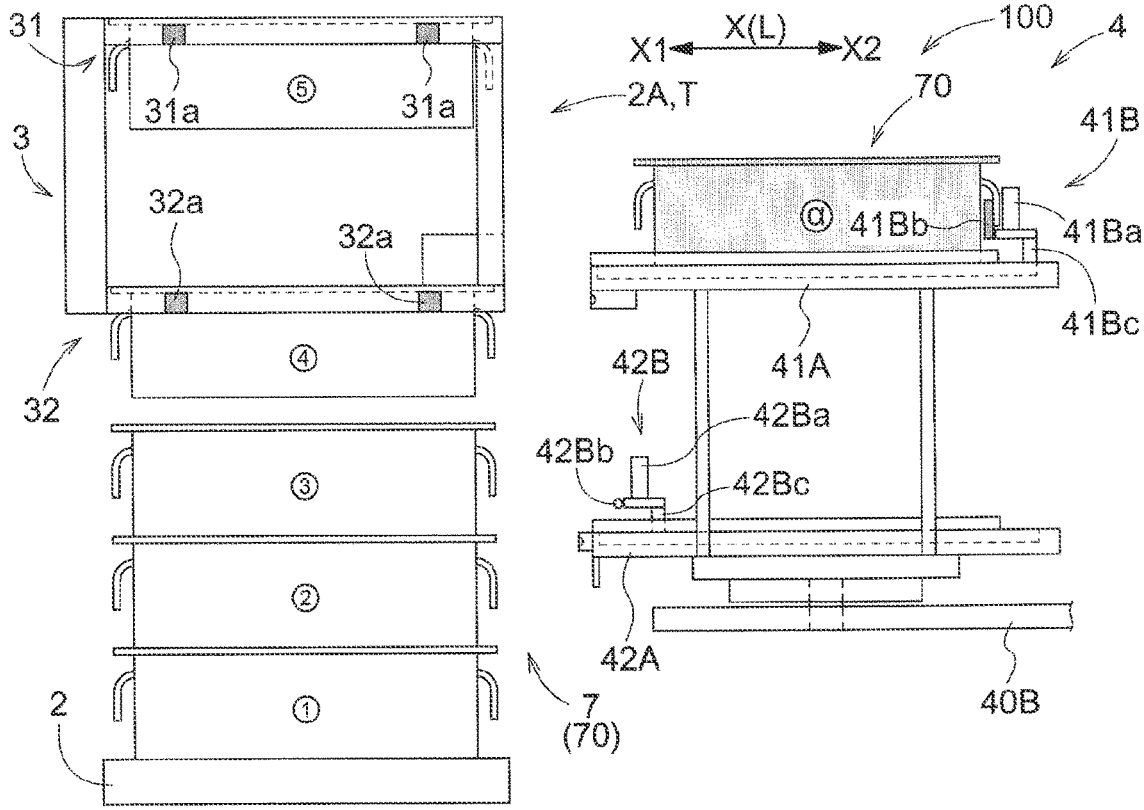
FIG. 9 is a diagram showing containers in a stacking region after having been lifted by a lifting device.

The lifting device 3 includes a first lifting mechanism 31 for lifting a container 70 at any height within the container group 7 stacked in the stacking region 2A up from the container 70 adjacent below the container 70 to be lifted, and a second lifting mechanism 32 for lifting a container 70 that is lower than the container 70 lifted by the first lifting mechanism 31 up from the container 70 adjacent below the container 70 to be lifted. In the present embodiment, the first lifting mechanism 31 and the second lifting mechanism 32 are separated vertically. A space can thereby be formed vertically between the container 70 lifted by the first lifting mechanism 31 and the container 70 lifted by the second lifting mechanism 32, as shown in FIG. 9, for example. A vertical space can also be formed downward of the container 70 lifted by the second lifting mechanism 32.

In the present embodiment, the lifting device 3 is provided with a frame unit FU that includes a plurality of frame sections. In the present example, the lifting device 3 includes a first frame section 31F and a second frame section 32F that protrude in the body length direction L toward the stacking region 2A from the lift elevating body 30B, and a coupling frame section 33F coupling the first frame section 31F and the second frame section 32F. That is, the frame unit FU includes the first frame section 31F, the second frame section 32F and the coupling frame section 33F. The first frame section 31F and the second frame section 32F are spaced apart from each other vertically. The first frame section 31F is higher than the second frame section 32F. The coupling frame section 33F couples the first frame section 31F and the second frame section 32F vertically. Such a configuration prevents relative movement of the first frame section 31F and the second frame section 32F, and maintains a constant vertical interval between the first frame section 31F and the second frame section 32F. The first frame section 31F, the second frame section 32F and the coupling frame section 33F (frame unit FU) are elevated up and down as one, following the lift elevating body 30B being elevated up and down.

In the present embodiment, the first frame section 31F includes a pair of first frame members 31Fa spaced apart from each other in the body width direction W. The pair of first frame members 31Fa are disposed in correspondence with the width (length in the body width direction W) of the containers 70 disposed in the stacking region 2A. The second frame section 32F includes a pair of second frame members 32Fa spaced apart from each other in the body width direction W. The pair of second frame members 32Fa are disposed in correspondence with the width of the containers 70 disposed in the stacking region 2A. The coupling frame section 33F includes a pair of coupling frame members 33Fa spaced apart from each other in the body width direction W. Each of the pair of coupling frame members 33Fa couples the first frame member 31Fa and the second frame member 32Fa that are aligned vertically.

As shown in FIG. 9, in the present embodiment, the first lifting mechanism 31 includes a first lifting holding section 31a for holding a container 70. The first lifting holding section 31a is capable of changing posture between a holding posture for holding a container 70 and a non-holding posture for not holding a container 70. In FIG. 9, the first lifting holding section 31a is in the holding posture.

Similarly, the second lifting mechanism 32 includes a second lifting holding section 32a for holding a container 70. The second lifting holding section 32a is capable of changing posture between a holding posture for holding a container 70 and a non-holding posture for not holding a container 70. In FIG. 9, the second lifting holding section 32a is in the holding posture.

Here, in FIG. 9, numbers 1 to 5 are given to the containers 70 stacked in the stacking region 2A in ascending order. Also, the container 70 held by the transfer device 4 is given the letter "a".

Figure 10:
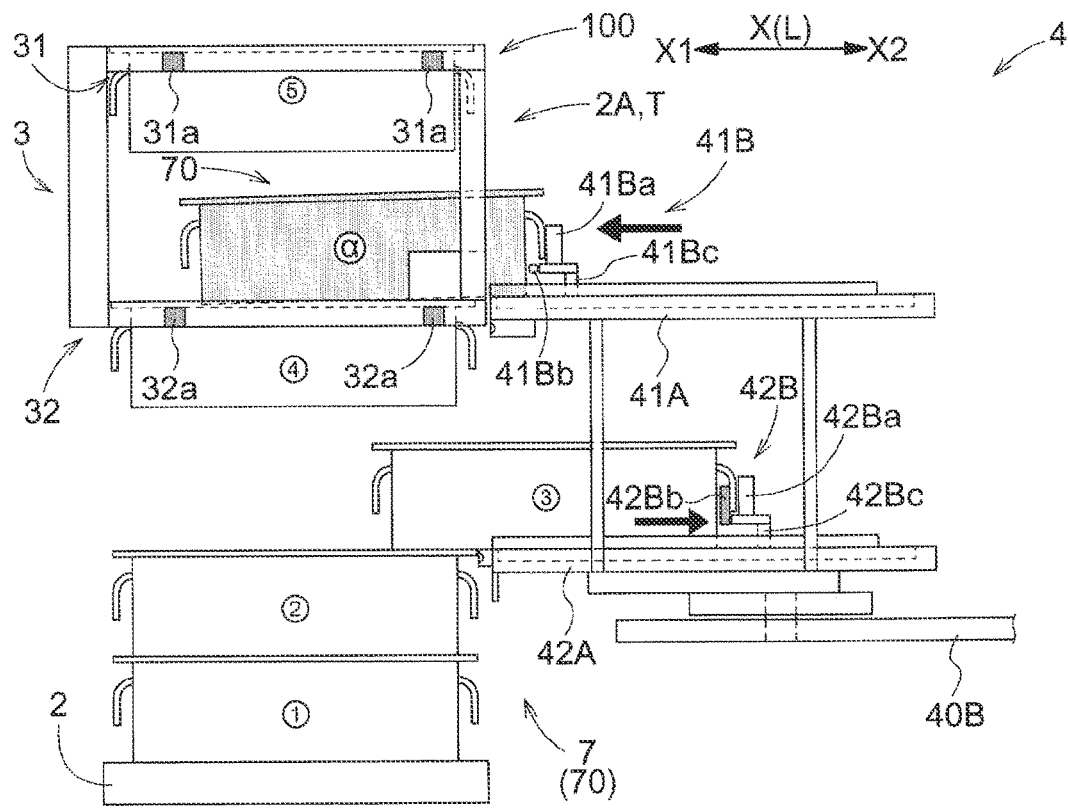
FIG. 10 is an illustrative view of performing parallel operations for loading and unloading containers with respect to the stacking region.

In the case where a space is formed vertically between the container 70 lifted by the first lifting mechanism 31 and the container 70 lifted by the second lifting mechanism 32, it is possible to unload another container 70 into this space. That is, another container 70 can be stacked on the container 70 lifted by the second lifting mechanism 32, with use of the transfer device 4. FIG. 10 shows an example of unloading a container 70 (container "a") held by the transfer device 4 into the space formed vertically between the container 70 (container "5") lifted by the first lifting mechanism 31 and the container 70 (container "4") lifted by the second lifting mechanism 32.

In the case where a space is formed vertically downward of the container 70 lifted by the second lifting mechanism 32, this space can be utilized to load the container 70 disposed downward of the container 70 lifted by the second lifting mechanism 32. FIG. 10 shows an example of loading the container 70 (container "3") disposed downward of the container 70 (container "4") lifted by the second lifting mechanism 32. Note that the operations for unloading and loading containers 70 with respect to the stacking region 2A will be described later.

Transfer Device

As shown in FIG. 4, the transfer device 4 serving as a functional section F is mounted on the travel body 1. The transfer device 4 transfers containers 70 with respect to a transfer target location T. The transfer device 4 performs an unloading operation for transferring a container 70 to the transfer target location T and a loading operation for transferring a container 70 from the transfer target location T. In the present embodiment, the transfer target location T includes the stacking region 2A and the rack section 80 of the container rack 8.

Here, the movement direction of a container 70 that is transferred by the transfer device 4 is given as "transfer direction X". Also, one side in the transfer direction X is given as "transfer direction unloading side X1", and the other side is given as "transfer direction loading side X2". In the present example, the transfer direction X is a direction extending horizontally. The transfer direction unloading side X1 is, in the case of unloading a container 70, the side to which the container 70 moves in the transfer direction X. The transfer direction loading side X2 is, in the case of loading a container 70, the side to which the container 70 moves in the transfer direction X.

Figure 5:
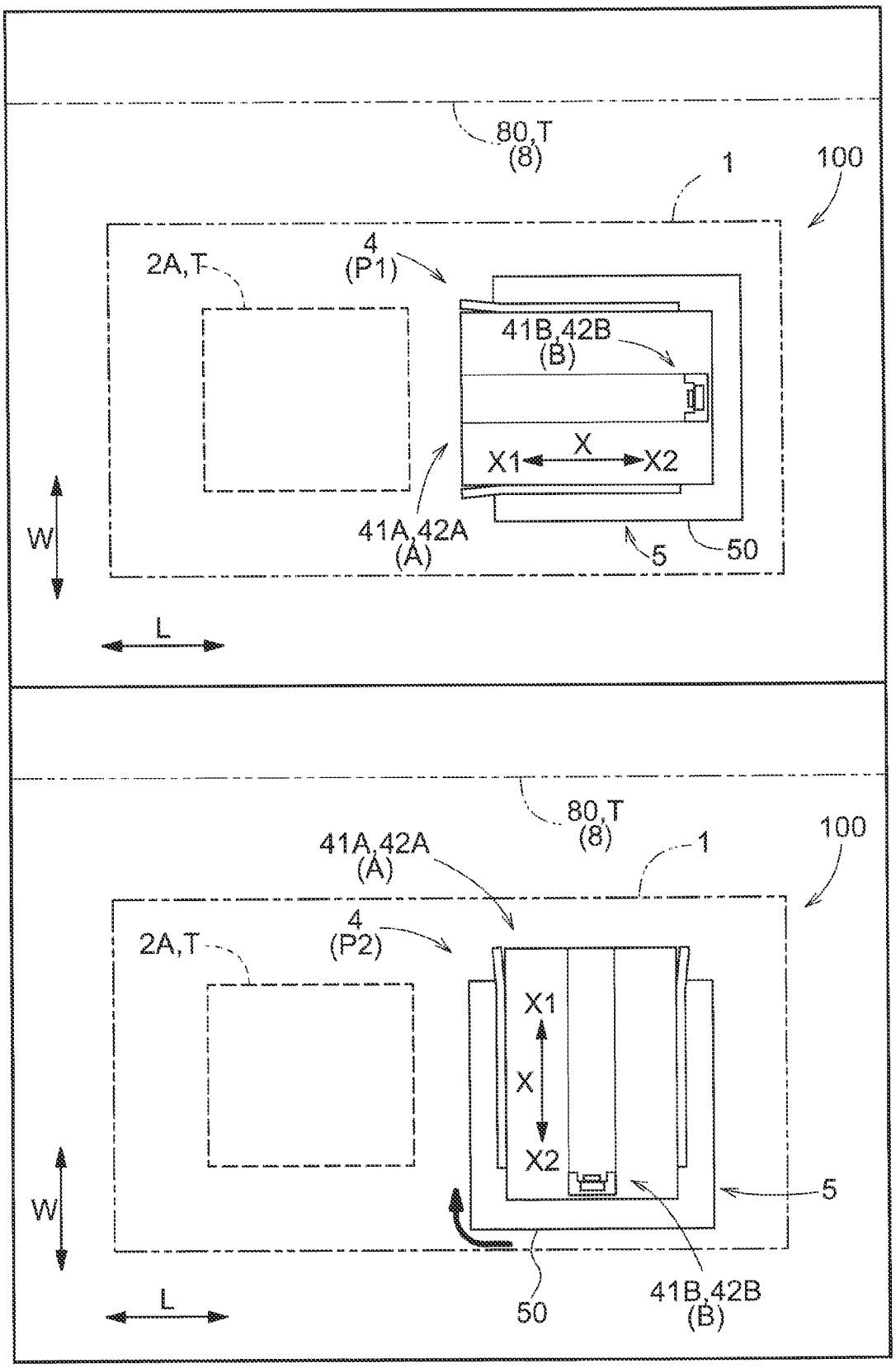
FIG. 5 is a plan view showing a first posture and a second posture of a transfer device.

In the present embodiment, the transport vehicle 100 includes a turning device 5 that turns the transfer device 4 around an axis extending vertically. As shown in FIG. 5, the turning device 5 turns the transfer device 4 (specifically, part of the transfer device 4) around an axis extending vertically, and changes the orientation of the transfer device 4 between a first posture P1 in which the transfer direction X faces the stacking region 2A and a second posture P2 in which the transfer direction X faces the container rack 8. In the present embodiment, the turning device 5 can thus change the transfer direction X in a horizontal plane.

In the present embodiment, the transfer device 4 changes posture according to the position of the transfer target location T. Specifically, the transfer device 4 will be in the first posture P1 if the transfer target location T is the stacking region 2A, and will be in the second posture P2 if the transfer target location T is the container rack 8 (rack section 80). As shown in FIG. 4, in the present example, the turning device 5 includes a turning base 50 that supports the transfer device 4 (specifically, part of the transfer device 4), a turning shaft 51 that supports the turning base 50 to be turnable relative to the transfer elevating body 40B, and a turning drive section (not shown) that drives the turning shaft 51.

As shown in FIG. 4, the transfer device 4 includes a transfer mast 40 that is fixed to the travel body 1 and disposed vertically, a transfer elevating body 40B that elevates up and down along the transfer mast 40, a holding section A that is coupled to the transfer elevating body 40B and holds the container 70, and a transfer machine B for transferring the container 70. Also, the transfer device 4 includes a transfer elevating body drive section 40M for elevating the transfer elevating body 40B up and down along the transfer mast 40. The transfer device 4 is thereby able to move the holding section A and the transfer machine B vertically, making it possible to transfer containers 70 to each of the rack sections 80 (see FIG. 3). Although not illustrated in detail, the transfer elevating body drive section 40M is a motor for rotationally driving a rotary body around which an endless body such as a belt is wound.

In the present embodiment, the transfer elevating body drive section 40M is the drive source of the transfer device 4 serving as a functional section F. Here, the transfer elevating body drive section 40M corresponds to a "second drive source". That is, the transport vehicle 100 is provided with a second drive source (transfer elevating body drive section 40M) for driving this functional section F.

The holding section A is coupled to the transfer elevating body 40B, and is capable of holding a container 70. In the present embodiment, the holding section A includes a first holding section 41A and a second holding section 42A disposed lower than the first holding section 41A. The first holding section 41A and the second holding section 42A are each capable of holding a container 70 independently.

In the present embodiment, the transfer device 4 includes a hold coupling section 43 that couples the first holding section 41A and the second holding section 42A vertically. The hold coupling section 43 couples the first holding section 41A and the second holding section 42A such that the vertical interval between both holding sections is constant.

The transfer machine B is capable of transferring a container 70 with respect to the rack section 80 and the stacking region 2A. In the case where the rack section 80 is the transfer target location T, the transfer machine B transfers the container 70 between the holding section A and the rack section 80. In the case where the stacking region 2A is the transfer target location T, the transfer machine B transfers the container 70 between the holding section A and the stacking region 2A. In the present example, the transfer machine B transfers a container 70 to the stacking region 2A in the first posture P1, and transfers a container 70 to the rack section 80 in the second posture P2 (see FIG. 5).

As shown in FIG. 4, in the present embodiment, the transfer machine B includes a first transfer machine 41B and a second transfer machine 42B disposed lower than the first transfer machine 41B. The first transfer machine 41B transfers a container 70 between the first holding section 41A and the transfer target location T. The second transfer machine 42B transfers a container 70 between the second holding section 42A and the transfer target location T.

Control Configuration

Figure 6:
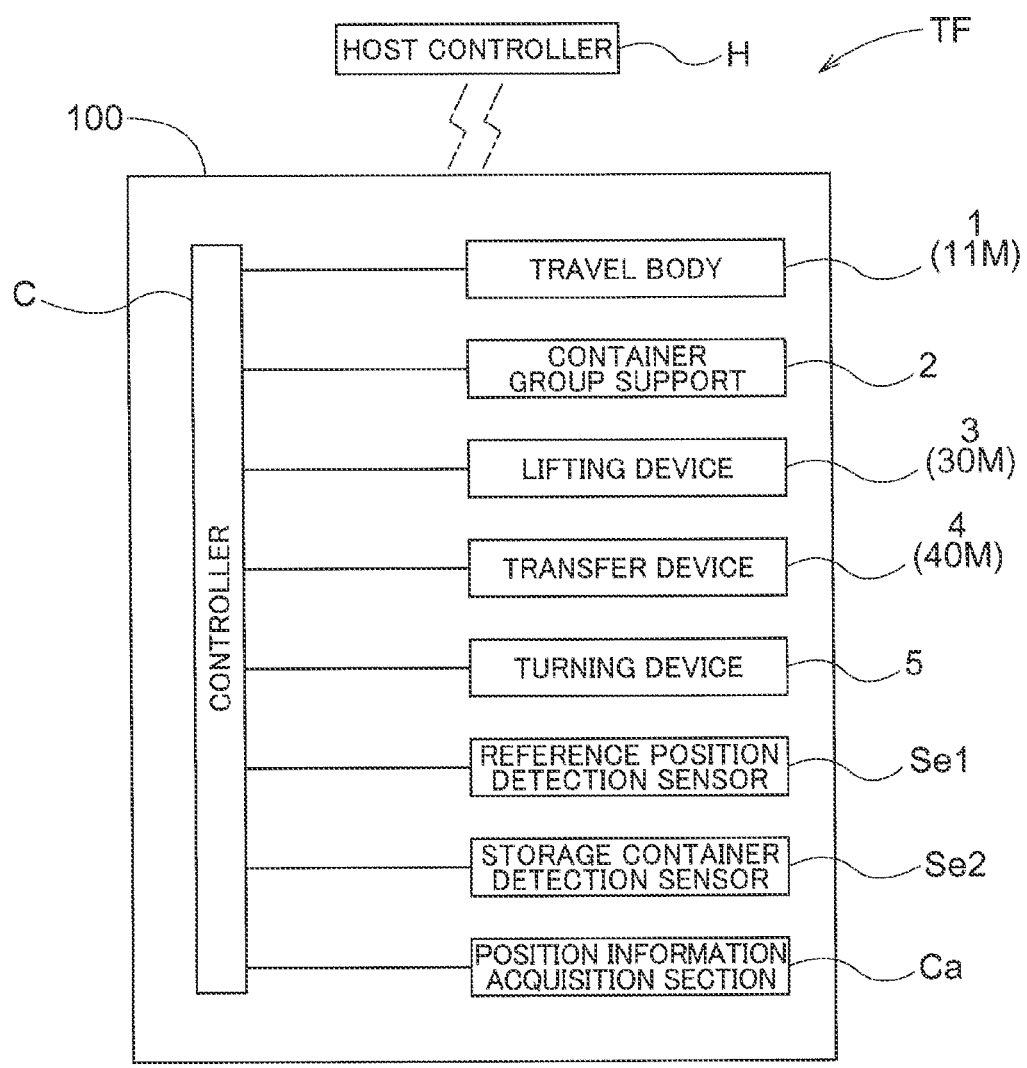
FIG. 6 is a control block diagram.

As shown in FIG. 6, the transport vehicle 100 includes the controller C that controls various sections. In the present embodiment, the controller C controls the travel body 1, the container group support 2, the lifting device 3, the transfer device 4 and the turning device 5. Operations for supporting, transporting and transferring the containers 70 are realized through control of various sections by the controller C. In the present example, the controller C causes various sections to perform operations for supporting, transporting and transferring the containers 70, based on detection results of a reference position detection sensor Se1 and a storage container detection sensor Se2 described later. The controller C includes a processor such as a microcomputer, a peripheral circuit such as a memory, and the like, for example. Various functions are realized through cooperation between the above hardware and programs that are executed on a processor such as a computer.

Transfer Operation

FIGS. 7 to 11 are illustrative views of the transfer device 4 performing a transfer operation (unloading operation or loading operation) of a container 70 with respect to the transfer target location T.

As shown in FIGS. 7 to 11, in the present embodiment, the first transfer machine 41B includes a first pushing section 41Ba that, in the case of performing the unloading operation of a container 70, pushes the container 70 toward the transfer direction unloading side X1, a first latching section 41Bb that, in the case of performing the loading operation of a container 70, is latched onto the container 70 and pulls the container 70 toward the transfer direction loading side X2, and a first support member 41Bc that supports the first pushing section 41Ba and the first latching section 41Bb. In the present example, the first support member 41Bc is driven by a drive section not shown, and moves in the transfer direction X relative to the first holding section 41A. The first pushing section 41Ba and the first latching section 41Bb are thereby movable in the transfer direction X relative to the first holding section 41A. The first pushing section 41Ba pushes the container 70 to be unloaded toward the transfer direction unloading side X1, by moving toward the transfer direction unloading side X1 relative to the first holding section 41A. The first latching section 41Bb pulls the container 70 to be loaded toward the transfer direction loading side X2, by moving toward the transfer direction loading side X2 relative to the first holding section 41A.

In the present embodiment, the second transfer machine 42B includes a second pushing section 42Ba that, in the case of performing the unloading operation of a container 70, pushes the container 70 toward the transfer direction unloading side X1, a second latching section 42Bb that, in the case of performing the loading operation of a container 70, is latched onto the container 70 and pulls the container 70 toward the transfer direction loading side X2, and a second support member 42Bc that supports the second pushing section 42Ba and the second latching section 42Bb. In the present example, the second support member 42Bc is driven by a drive section not shown, and moves in the transfer direction X relative to the second holding section 42A. The second pushing section 42Ba and the second latching section 42Bb are thereby movable in the transfer direction X relative to the second holding section 42A. The second pushing section 42Ba pushes the container 70 to be unloaded toward the transfer direction unloading side X1, by moving toward the transfer direction unloading side X1 relative to the second holding section 42A. Also, the second latching section 42Bb pulls the container 70 toward the transfer direction loading side X2, by moving toward the transfer direction loading side X2 relative to the second holding section 42A.

In the present embodiment, the first latching section 41Bb and the second latching section 42Bb are each driven by a drive section not shown, and are capable of changing posture between a latching posture for being latched onto a container 70 and a non-latching posture for not being latched onto a container 70. In FIGS. 7 to 11, the first latching section 41Bb or second latching section 42Bb in the latching posture is shown in gray, and the first latching section 41Bb or second latching section 42Bb in the non-latching posture is shown in white.

Figure 7:
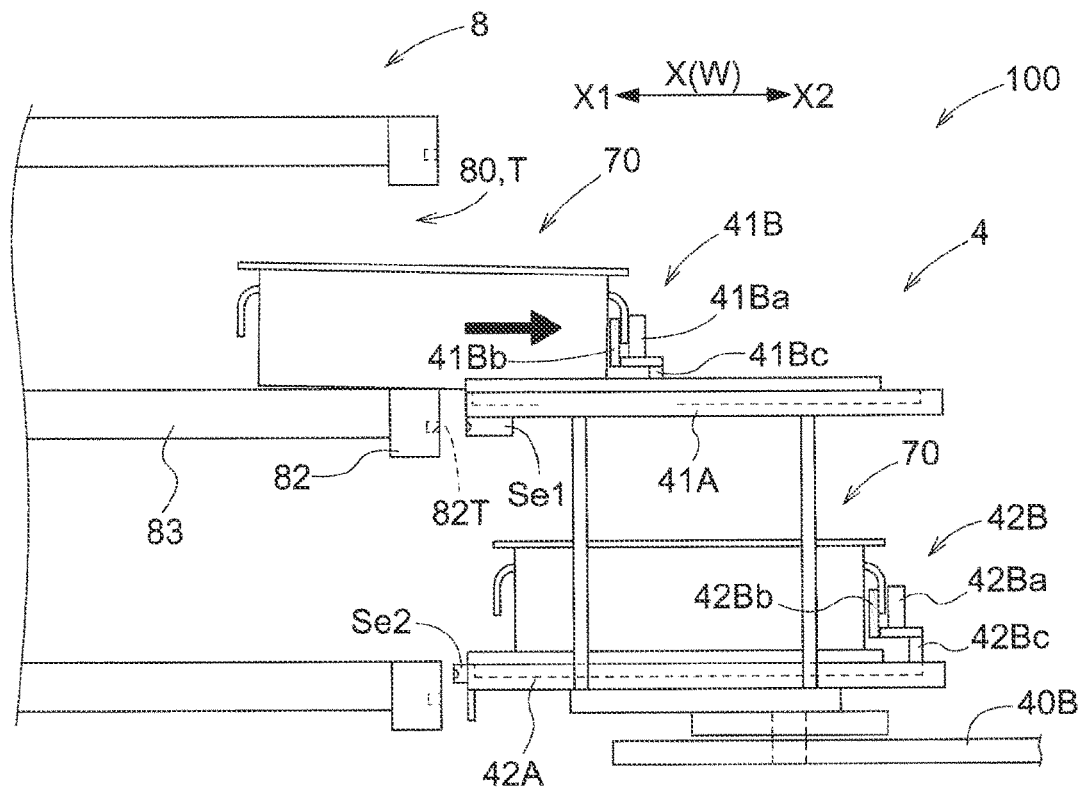
FIG. 7 is an illustrative view showing an operation for loading a container from a rack section.

FIG. 7 shows a loading operation (transfer operation) of a container 70 with respect to the rack section 80, and illustrates the case where the first transfer machine 41B loads a container 70 stored in the rack section 80 to the first holding section 41A. In this case, the controller C (see FIG. 6) aligns the position of the first transfer machine 41B with the reference position 80P (see FIG. 3) of the rack section 80, and then pulls the container 70 toward the transfer direction loading side X2 with the first latching section 41Bb.

In the present embodiment, the transfer device 4 includes the reference position detection sensor Se1 that detects the reference position 80P (see FIG. 3) of the rack section 80. As described above, the reference position 80P is a position serving as a reference for storing a container 70 in the rack section 80.

The reference position detection sensor Se1 detects the positional relationship between the transfer device 4 including the reference position detection sensor Se1 and the reference position 80P of the rack section 80, by detecting the target section 82T provided in the beam member 82. Transfer of a container 70 with respect to the rack section 80 can then be appropriately performed, by controlling the travel body 1, the turning device 5 and the transfer elevating body drive section 40M, based on the result of detecting the target section 82T by the reference position detection sensor Se1, to perform an operation for correcting the position of the transfer device 4. In the present example, the reference position detection sensor Se1 is constituted by a camera. The positional relationship between the transfer device 4 and the target section 82T provided in the beam member 82 can be detected, through image recognition of the reference position detection sensor Se1 constituted as a camera. For example, the reference position detection sensor Se1 may have a function as a ranging sensor for detecting the distance to the target.

Figure 8:
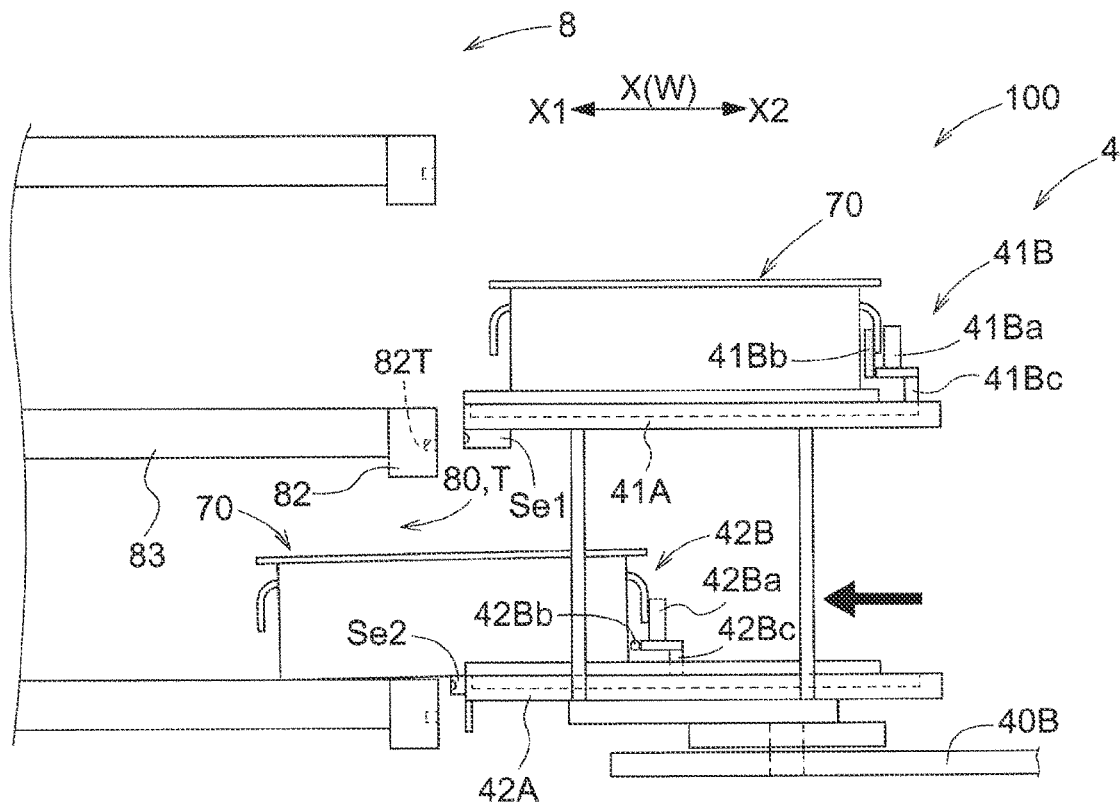
FIG. 8 is an illustrative view showing an operation for unloading a container onto a rack section.

FIG. 8 shows the unloading operation (transfer operation) of a container 70 with respect to the rack section 80, and illustrates the case where the second transfer machine 42B unloads a container 70 held in the second holding section 42A to the rack section 80. In this case, if it is determined that another container 70 is not stored in the rack section 80 to which the container 70 is to be unloaded, the controller C (see FIG. 6) pushes the container 70 toward the transfer direction unloading side X1 with the second pushing section 42Ba.

In the present embodiment, the transfer device 4 includes the storage container detection sensor Se2 that detects a container 70 stored in the rack section 80.

In the case of the transfer device 4 performing the unloading operation for transferring a container 70 to a rack section 80, the storage container detection sensor Se2 detects the presence or absence of a container 70 in the rack section 80 to be transferred to. If the storage container detection sensor Se2 detects that there is no container 70 in the rack section 80 to be unloaded to, the transfer device 4 performs the operation for unloading the container 70 to the rack section 80. If the storage container detection sensor Se2 detects that there is a container 70 in the rack section 80 to be unloaded to, the transfer device 4 may transfer the container 70 to another rack section 80 that is empty, or may stop the transfer. For example, the storage container detection sensor Se2 may also be a ranging sensor for detecting the distance to the target. The transfer operation can thereby be performed while measuring the distance between the transfer device 4 and the transfer target location T. In the present embodiment, the storage container detection sensor Se2 is an optical sensor that projects light onto the target. The present disclosure is, however, not limited to such a configuration, and the storage container detection sensor Se2 may be constituted using known means such as an ultrasonic sensor or a camera, for example.

Figure 11:
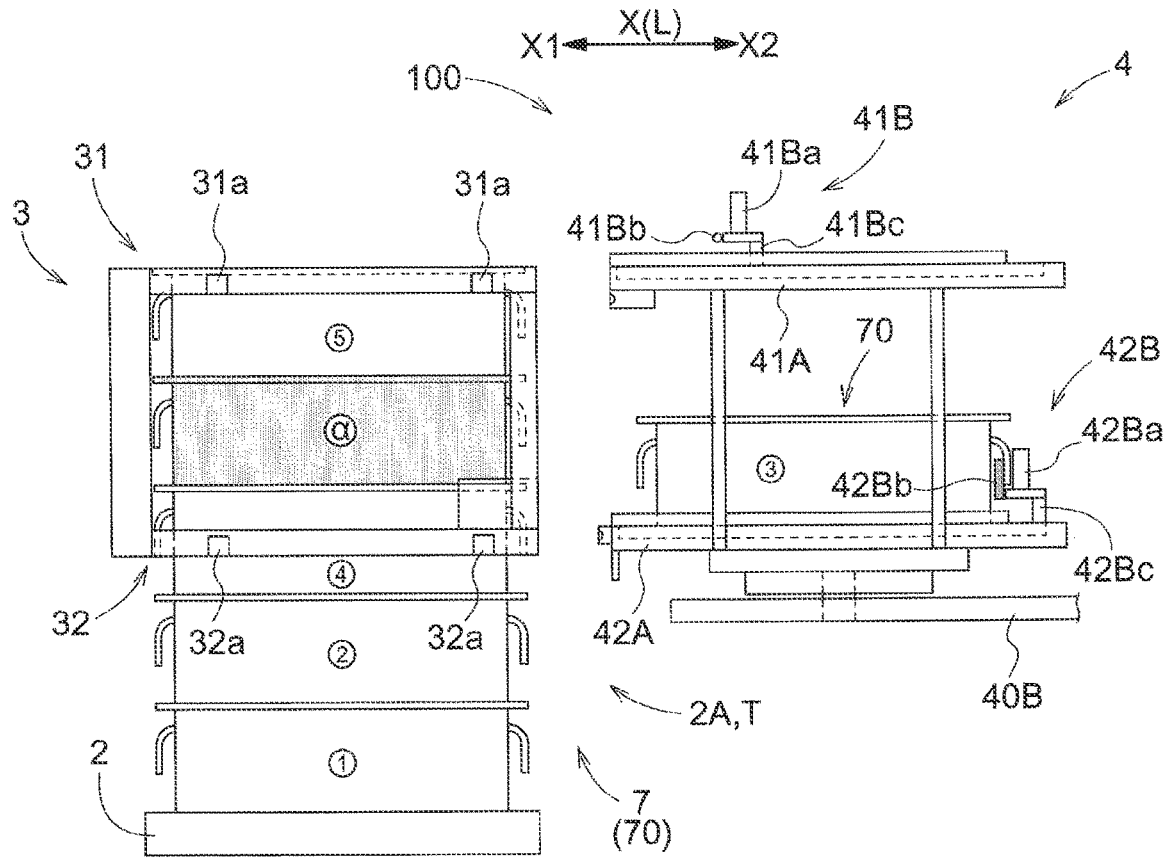
FIG. 11 is an illustrative view of performing parallel operations for loading and unloading containers with respect to the stacking region.

FIGS. 9 to 11 show the transfer operation of containers 70 with respect to the stacking region 2A. As described above, in the present embodiment, spaces can be formed vertically between a plurality of containers 70 stacked in the stacking region 2A, by the lifting device 3. The transfer device 4 then utilizes these spaces to transfer containers 70 with respect to the stacking region 2A. In the present embodiment, the transfer device 4 performs the loading operation and unloading operation of containers 70 with respect to the stacking region 2A. Specifically, the transfer device 4 performs parallel operations for performing loading and unloading of containers 70 in parallel with respect to the stacking region 2A.

FIGS. 9 to 11 show an example in which five containers 70 are stacked as a container group 7 in the stacking region 2A. In these diagrams, the stacked containers 70 are numbered "1 to 5" in ascending order. The letter "a" is given to the container 70 to be unloaded held by the first holding section 41A. In the example shown below, the container 70 (container "a") to be unloaded is unloaded onto the fourth container 70 (container "4"), utilizing the space formed vertically between the fifth container 70 (container "5") and the fourth container 70 (container "4") by the lifting device 3. In parallel therewith, the third container 70 (container "3") is loaded, utilizing the space formed downward of the fourth container 70 (container "4") by the lifting device 3.

As shown in FIG. 10, the controller C (see FIG. 6) moves the second latching section 42Bb in the latching posture to the transfer direction loading side X2 relative to the second holding section 42A with the second latching section 42Bb latched onto the third container 70 (container "3"). In parallel therewith, the controller C moves the first pushing section 41Ba to the transfer direction unloading side X1 relative to the first holding section 41A, with the container 70 (container "a") held by the first holding section 41A being pushed by the first pushing section 41Ba. The second latching section 42Bb thereby pulls the container 70 (container "3") to be loaded to the transfer direction loading side X2, and the first pushing section 41Ba pushes the container 70 (container "a") to be unloaded to the transfer direction unloading side X1.

The controller C then disposes the container 70 (container "3") to be loaded that is pulled by the second latching section 42Bb on the second holding section 42A, and disposes the container 70 (container "a") to be unloaded that is pushed by the first pushing section 41Ba upward of the container 70 (container "4") lifted by the second lifting holding section 32a in such a manner as to fit onto the lifted container 70 (container "4"). The container group 7 in the stacking region 2A will thereby be a state such as shown in FIG. 11. That is, one (container "3") of the containers 70 disposed in the stacking region 2A is replaced with a new container 70 (container "a").

Figure 12:
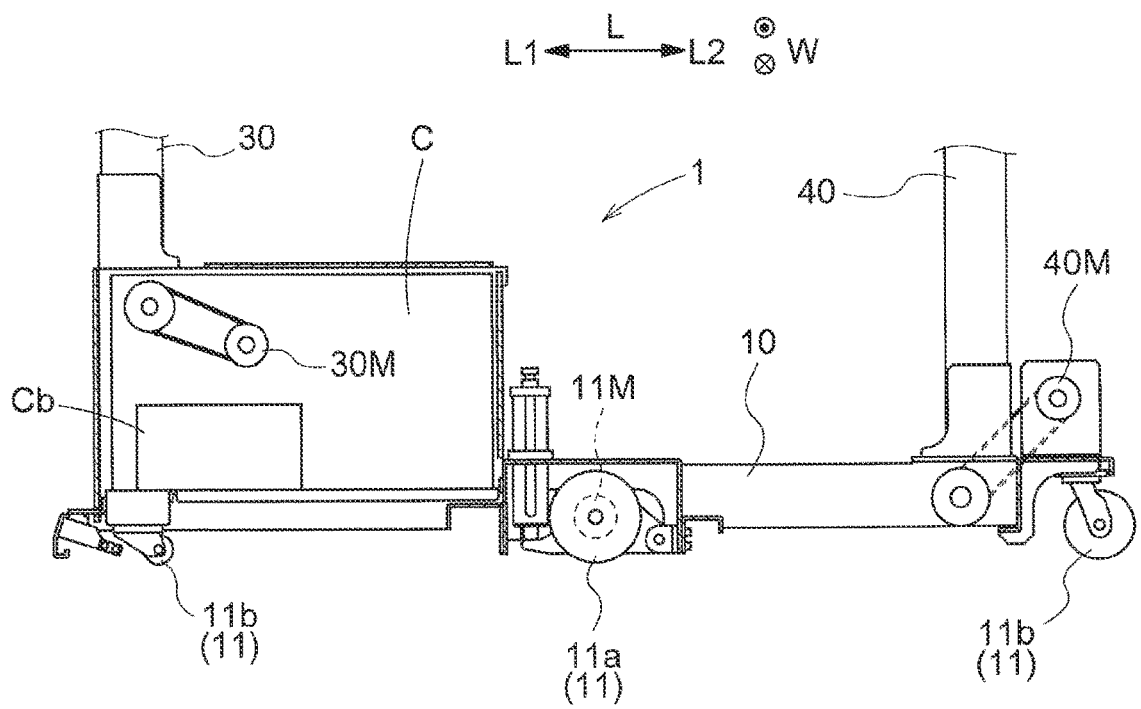
FIG. 12 is a view schematically showing a main section of the travel body in the body width direction.
Figure 13:
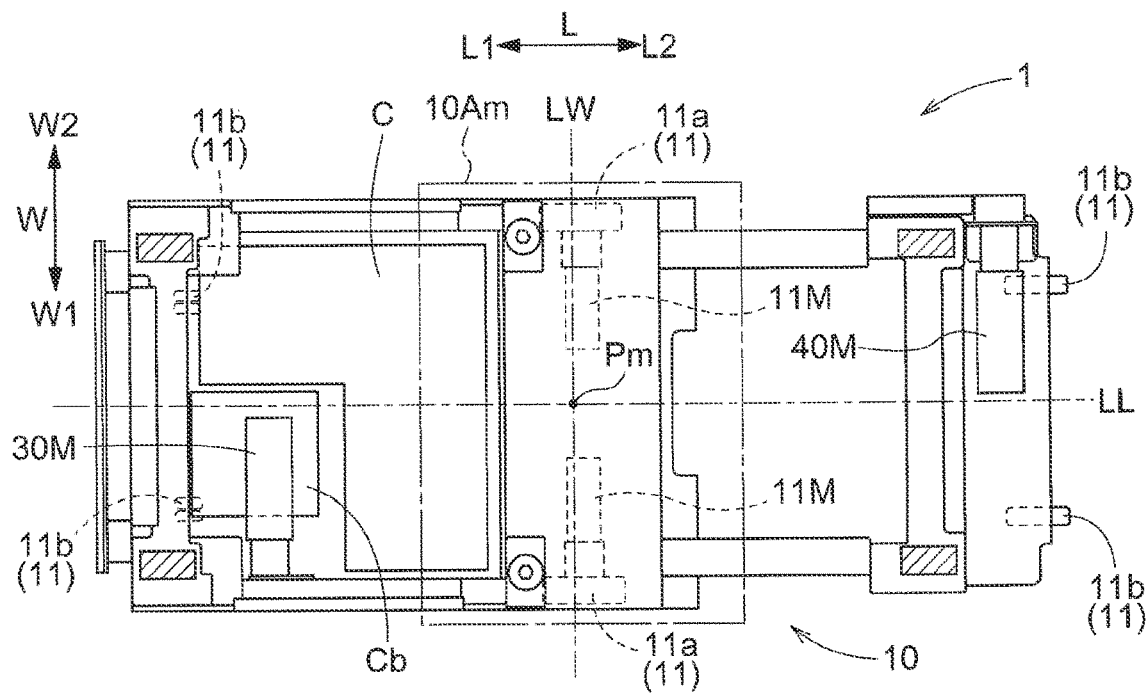
FIG. 13 is a plan view schematically showing a main section of the travel body.

Here, as described above, the transport vehicle 100 includes functional sections F (in the present example, lifting device 3 and transfer device 4) for supporting and transferring containers 70, and a first drive source (in the present example, lift elevating body drive section 30M) and a second drive source (in the present example, transfer elevating body drive section 40M) for driving the functional sections F. Such drive sources 30M and 40M for driving the functional sections F tend to be comparatively heavy loads among the members constituting the transport vehicle 100. By giving consideration to the disposition position of such drive sources 30M and 40M, improvement in the weight balance of the transport vehicle 100 can be expected, and, consequently, stabilization of the behavior of the transport vehicle 100 when the transport vehicle 100 is turning in order to change direction or the like can be expected FIG. 12 is a view schematically showing a main section of the travel body 1 in the body width direction W. FIG. 13 is a plan view schematically showing a main section of the travel body 1. Hereinafter, one side in the body length direction L will be given as a first side L1 in the body length direction, and the other side in the body length direction L will be given as a second side L2 in the body length direction. Also, one side in the body width direction W will be given as a first side W1 in the body width direction, and the other side in the body width direction W will be given as a second side W2 in the body width direction.

As shown in FIGS. 12 and 13, the travel body 1 includes a travel body section 10 and a plurality of travel wheels 11 supported by the travel body section 10. The travel wheels 11 include a pair of drive wheels 11a and a plurality of driven wheels 11b. The pair of drive wheels 11a are driven by a wheel drive source 11M. That is, the travel body 1 includes the travel body section 10, the pair of drive wheels 11a supported by the travel body section 10, and the wheel drive source 11M that drives the pair of drive wheels 11a.

The pair of drive wheels 11a are drivable by the wheel drive source 11M to rotate at identical speeds or different speeds to each other. In the present embodiment, the pair of drive wheels 11a are independently driven by different wheel drive sources 11M. Note that the case where the pair of drive wheels 11a are rotationally driven at different speeds to each other includes the case where one of the pair of drive wheels 11a is rotationally driven in the forward direction, and the other drive wheel 11a is rotationally driven in the reverse direction. In other words, the pair of drive wheels 11a may be rotationally driven in opposite directions to each other.

In the present embodiment, the driven wheels 11b are provided on both sides in the body length direction L with respect to the pair of drive wheels 11a. That is, in the present example, four driven wheels 11b are supported by the travel body section 10. Each driven wheel 11b is supported by the travel body section 10 to be rotatable around an axis extending vertically. That is, the direction in which the rotation axis of the driven wheel 11b extends can be changed in a horizontal plane. In the present example, the driven wheels 11b are casters.

In the present embodiment, the transport vehicle 100 is able to perform a so-called spin turn in which the travel body 1 is made to turn on the spot around a vertical axis, due to the pair of drive wheels 11a being rotationally driven in opposite directions to each other. In the present example, the transport vehicle 100 changes the movement direction of the travel body 1, by performing a spin turn in the direction change region DA (see FIG. 1). Changing the movement direction of the travel body 1 is, however, also possible by means other than a spin turn. For example, the transport vehicle 100 may change the movement direction of the travel body 1, by stopping rotation of one of the pair of drive wheel 11a and rotating the other drive wheel 11a, or by rotating the pair of drive wheels 11a in the same direction but at different speeds.

When the transport vehicle 100 performs a turn including a spin turn, the behavior of the transport vehicle 100 could possibly be destabilized if the center of gravity of the transport vehicle 100 is greatly biased in the body length direction L and the body width direction W. However, the transport vehicle 100 according to the present disclosure is capable of stabilizing the behavior of the transport vehicle 100 when performing a turn including a spin turn. Hereinafter, this will be described in detail.

The pair of drive wheels 11a are disposed in a middle region 10Am of the travel body section 10 in the body length direction L and are separated from each other in the body width direction W. The middle region 10Am is a region near the middle of the travel body section 10 in the body length direction L. In the present embodiment, the middle region 10Am is the middle of three regions obtained by dividing the dimension of the travel body section 10 in the body length direction L equally in three. In the present example, the pair of wheel drive sources 11M are disposed in the middle region 10Am of the travel body section 10.

Here, as shown in FIG. 13, a virtual line extending in the body width direction W to connect the pair of drive wheels 11a in top-down view is given as a width direction reference line LW, and a virtual line intersecting the width direction reference line LW in top-down view at an intermediate position Pm of the pair of drive wheels 11a in the body width direction W and extending in the body length direction L is given as a length direction reference line LL.

The lift elevating body drive section 30M, which is the first drive source, and the transfer elevating body drive section 40M, which is the second drive source, are mounted on the travel body section 10. The lift elevating body drive section 30M is disposed on the first side L1 in the body length direction relative to the width direction reference line LW and on the first side W1 in the body width direction relative to the length direction reference line LL in top-down view. The transfer elevating body drive section 40M is disposed on the second side L2 in the body length direction relative to the width direction reference line LW and on the second side W2 in the body width direction relative to the length direction reference line LL in top-down view. The lift elevating body drive section 30M and the lift elevating body drive section 40M which tend to be heavy loads are thereby disposed diagonally in top-down view, with respect to the turning center of the travel body 1. Thus, the center of gravity of the transport vehicle 100 can be prevented from being greatly biased in the body length direction L and the body width direction W. Accordingly, with the above configuration, it is possible to stabilize the behavior of the transport vehicle 100 when performing a turn including a spin turn.

In the present embodiment, the distance by which the lift elevating body drive section 30M is separated from the width direction reference line LW in the body length direction L is equivalent to the distance by which the transfer elevating body drive section 40M is separated from the width direction reference line LW in the body length direction L. Furthermore, the distance by which the lift elevating body drive section 30M is separated from the length direction reference line LL in the body width direction W is equivalent to the distance by which the transfer elevating body drive section 40M is separated from the length direction reference line LL in the body width direction W. The position of the center of gravity of the transport vehicle 100 can thereby be easily approximated to the turning center that the travel body 1 turns around when the transport vehicle 100 performs a spin turn (turn), which tends to further stabilize the behavior of the transport vehicle 100. Note that the respective distances by which the lift elevating body drive section 30M is separated from the reference lines LW and LL are defined based on the center of the lift elevating body drive section 30M in top-down view. Similarly, the respective distances by which the transfer elevating body drive section 40M is separated from the reference lines LW and LL are defined based on the center of the transfer elevating body drive section 40M in top-down view.

As shown in FIG. 12, in the present embodiment, the lift elevating body drive section 30M and the transfer elevating body drive section 40M are disposed lower than the container group support 2. The position of the center of gravity of the transport vehicle 100 can thereby be lowered, making it possible to further stabilize the behavior of the transport vehicle 100 when performing a turn including a spin turn.

In the present embodiment, the lift elevating body drive section 30M is disposed to at least a partially overlap the container group support 2 in top-down view. Also, the lift elevating body drive section 30M is disposed in close proximity to the container group support 2 and the lifting device 3. Accordingly, with the above configuration, the lift elevating body drive section 30M, which is the first drive source, and the lifting device 3, which is to be driven by the lift elevating body drive section 30M, can be disposed close to each other, thus facilitating transmission of the drive force from the lift elevating body drive section 30M to the lifting device 3. For example, it becomes possible to simplify the configuration of the power transmission path on which this drive force is transmitted.

In the present embodiment, the transfer elevating body drive section 40M is disposed to not overlap the transfer device 4 in top-down view. A wide elevation range for elevating containers 70 up and down with the transfer device 4 can thereby be secured. In the present embodiment, the transfer elevating body drive section 40M is disposed to not overlap the transfer elevating body 40B in top-down view (see FIG. 14). It is thereby possible to secure a wide elevatable range VR (see FIG. 14) of the transfer lifting body 40B described later.

As described above, the transport vehicle 100 includes the controller C that controls various sections of the transport vehicle 100. Furthermore, in the present embodiment, the transport vehicle 100 includes a power storage device Cb for supplying power to the wheel drive sources 11M, the lift elevating body drive section 30M serving as the first drive source, and the transfer elevating body drive section 40M serving as the second drive source.

The controller C and the power storage device Cb are mounted on the travel body section 10. In the present embodiment, the controller C is disposed lower than the container group support 2. Also, the power storage device Cb is disposed lower than the container group support 2. By disposing the controller C and the power storage device Cb, which tend to be comparatively heavy loads, lower than the container group support 2, the position of the center of gravity of the transport vehicle 100 can be lowered, making it possible to further stabilize the behavior of the transport vehicle 100 when performing a turn including a spin turn.

Furthermore, in the present embodiment, the controller C is disposed on the first side L1 in the body length direction relative to the width direction reference line LW in top-down view. Also, the power storage device Cb is disposed on the first side L1 in the body length direction relative to the width direction reference line LW in top-down view. The position of the center of gravity of the transport vehicle 100 changes with an increase or decrease in the number of containers 70 constituting the container group 7 supported by the stacking region 2A. According to the above configuration, the controller C and the power storage device Cb, which tend to be heavy loads, can be disposed at a position overlapping, in top-down view, the stacking region 2A where the containers 70 are stacked or at a position close thereto. Thus, even if there is an increase or decrease in the number of containers 70 constituting the container group 7, the amount of change in the position of the center of gravity of the transport vehicle 100 can be kept low. Accordingly, stabilizing the behavior of the transport vehicle 100 when performing a turn including a spin turn is facilitated.

Figure 14:
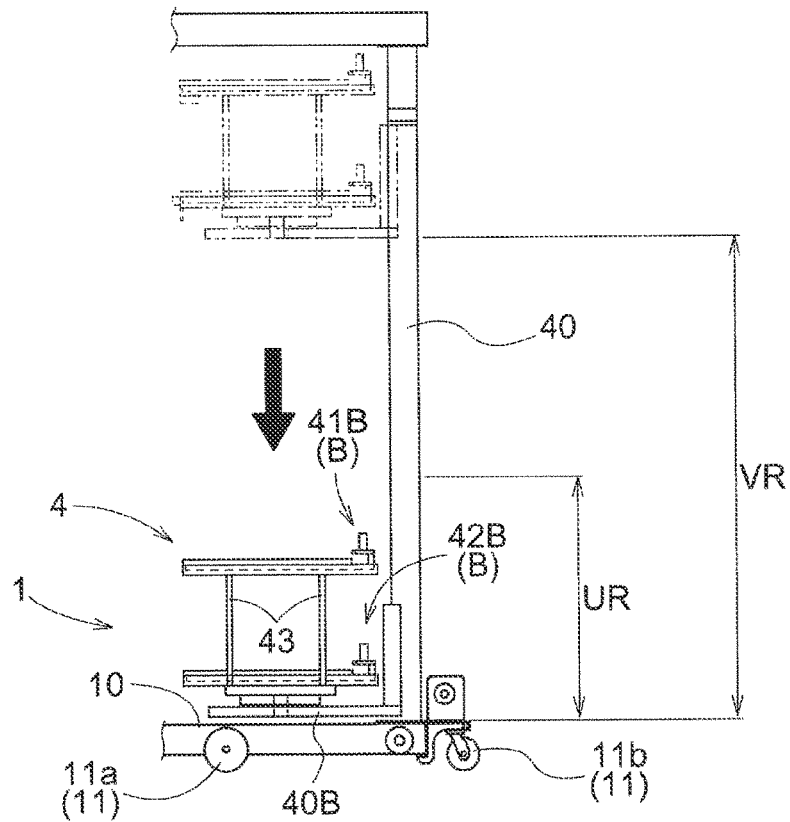
FIG. 14 is an illustrative view showing operations of the transfer device according to center-of-gravity reduction control.

As shown in FIG. 14, in the present embodiment, the controller C (see FIG. 6) is capable of executing center-of-gravity reduction control for controlling the position of the transfer elevating body 40B to be located within a lower range UR set lower than the middle of an elevatable range VR. The controller C executes center-of-gravity reduction control by controlling the transfer device 4. Specifically, the controller C executes center-of-gravity reduction control by controlling the transfer elevating body drive section 40M (see FIG. 12, etc.). By executing this center-of-gravity reduction control, the center of gravity of the entire transport vehicle 100 is lowered, making it unlikely that the transport vehicle 100 will tip over. The behavior of the transport vehicle 100 when performing a turn including a spin turn also tends to be stabilized. In the present embodiment, the controller C, in the center-of-gravity reduction control, positions the transfer elevating body 40B in the lowermost section of the elevatable range VR. The transport vehicle 100 is thereby made even less likely to tip over, and the behavior of the transport vehicle 100 when performing a turn also tends to be further stabilized.

The controller C determines whether the travel body 1 is in the rack region IA or in the external region OA (see FIG. 2), and executes center-of-gravity reduction control in at least part of the external region OA. In the external region OA, there are few structures such as the container racks 8 that can serve as support for the transport vehicle 100 when the travel body 1 is in the rack region IA. However, as described above, due to center-of-gravity reduction control being executed in at least part of the external region OA, the center of gravity of the entire transport vehicle 100 can be lowered when the transport vehicle 100 is in the external region OA, thus making it unlikely that the transport vehicle 100 will tip over in the external region OA. Also, as described above, the external region OA is provided with direction change regions DA, which are regions for the travel body 1 to change the movement direction. Thus, direction change can be performed by a spin turn or the like in the direction change regions DA, with the center of gravity of the transport vehicle 100 lowered.

In the present embodiment, the transport vehicle 100 includes a position information acquisition section Ca (see FIG. 6) that acquires current position information of the travel body 1. In the present example, the controller C determines whether the travel body 1 is in the rack region IA or is in the external region OA, based on the position information acquired by the position information acquisition section Ca. In the present example, the position information acquisition section Ca acquires current position information of the travel body 1 that is transmitted from the host controller H that manages the entire facility. In this case, the host controller H grasps the positions of travel bodies 1 (transport vehicles 100) that are present in the facility as a whole, and transmits current position information of the travel bodies 1 (transport vehicles 100) to the position information acquisition section Ca.

Figure 15:
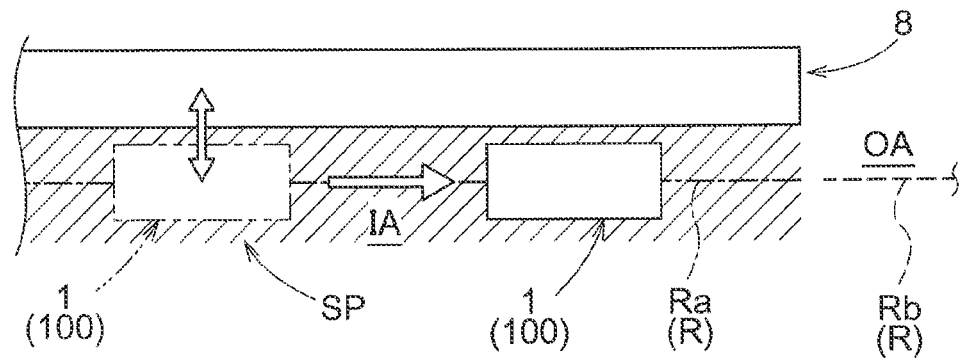
FIG. 15 is an illustrative view showing the timing for starting center-of-gravity reduction control.

As shown in FIG. 15, in the present embodiment, the position where the travel body 1 stops when the transfer device 4 (see FIG. 4, etc.) transfers containers 70 to and from the container rack 8 is given as a transfer stop position SP, and, after completing the transfer of containers 70 at the last transfer stop position SP before entering the external region OA from the rack region IA along the travel path R of the travel body 1, the controller C starts center-of-gravity reduction control before the travel body 1 enters the external region OA. The controller C then keeps executing the center-of-gravity reduction control while the travel body 1 is in the external region OA. In the present example, in the case of the transfer device 4 performing the next transfer of containers 70, the controller C keeps executing the center-of-gravity reduction control after the travel body 1 has entered the external region OA for the duration that the travel body 1 is in the external region OA, and until the next transfer is executed after the travel body 1 enters the rack region IA.

Next, the processing procedure in the case of executing the center-of-gravity reduction control will be described, with reference to the flowchart in FIG. 16.

Figure 16:
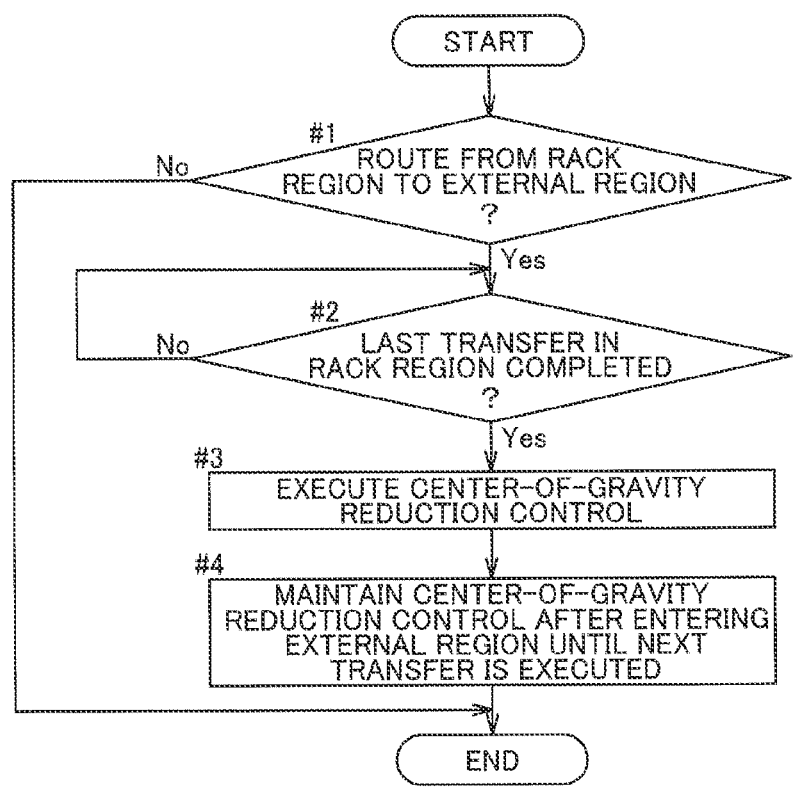
FIG. 16 is a flowchart showing a processing procedure in the case of executing center-of-gravity reduction control.

As shown in FIG. 16, the controller C determines whether the route that the travel body 1 is currently traveling on is a route from the rack region IA to the external region OA (step #1). The route that the travel body 1 takes is included in a transport instruction that is transmitted from the host controller H, for example. In this case, the controller C performs determination of the route, based on the transport instruction.

If it is determined that the route that the travel body 1 is currently traveling on is not a route from the rack region IA to the external region OA (step #1: No), the controller C ends the routine. If it is determined that the route that the travel body 1 is currently traveling on is a route from the rack region IA to the external region OA (step #1: Yes), the controller C determines whether the last transfer in the rack region IA has been completed (step #2).

If it is determined that the last transfer in the rack region IA has not been completed (step #2: No), the controller C repeats the processing of step #2. If it is determined that the last transfer in the rack region IA has been completed (step #2: Yes), the controller C executes the center-of-gravity reduction control (step #3). The controller C then keeps executing the center-of-gravity reduction control until the transfer machine B performs the next transfer of containers 70 after the travel body 1 has left the external region OA and entered the rack region IA (step #4).

As described above, the transport vehicle 100 is configured, in terms of structure and control, to lower the position of the center of gravity of the transport vehicle 100. It is thereby possible to stabilize the behavior of the transport vehicle 100 when performing a turn including a spin turn.

Second Embodiment

Next, a second embodiment of the transport vehicle will be described with reference to FIGS. 17 to 20. Points that are similar to the first embodiment will not be described in detail below.

Figure 17:
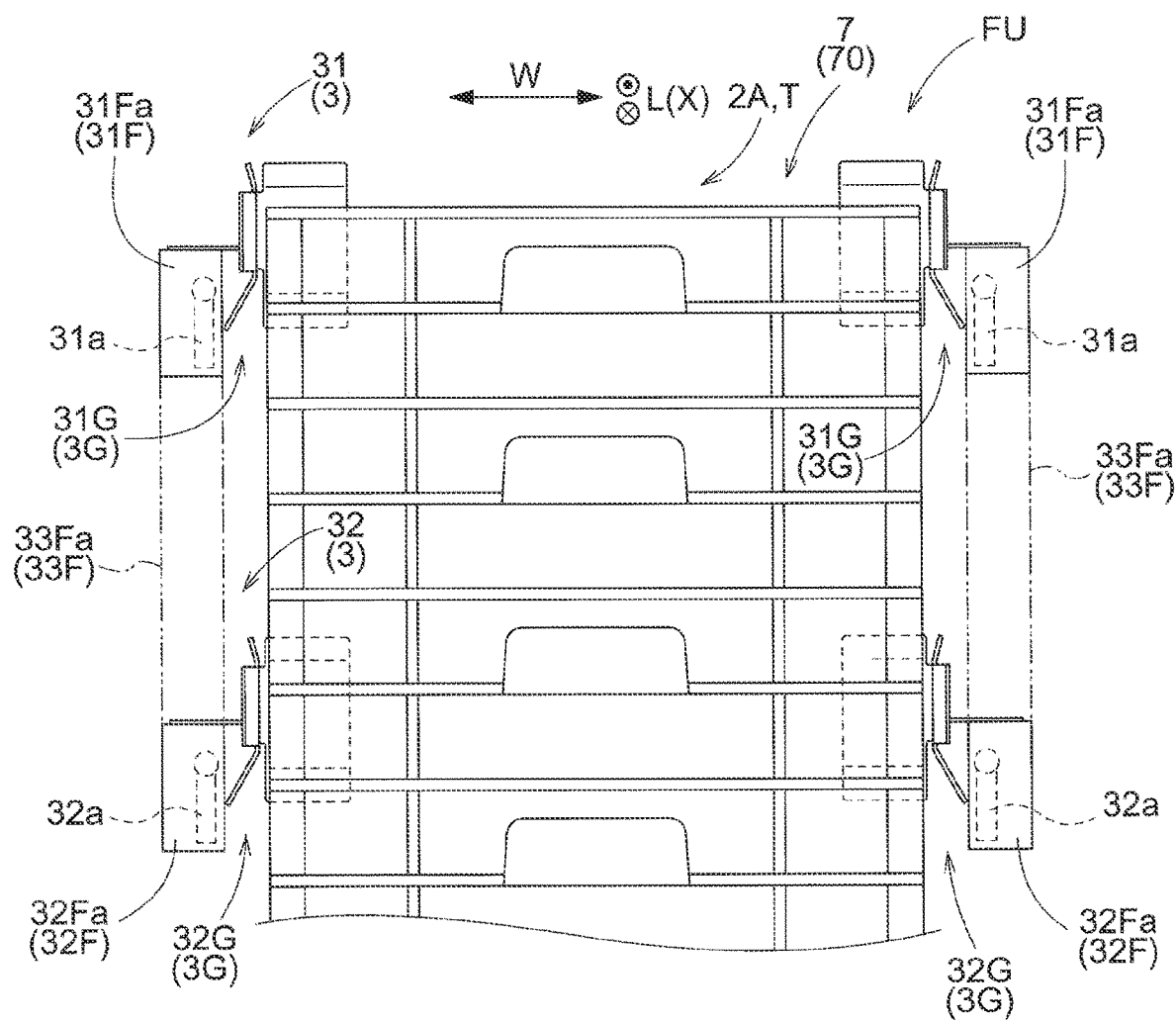
FIG. 17 is a view in a body length direction showing a lifting device according to a second embodiment.
Figure 18:
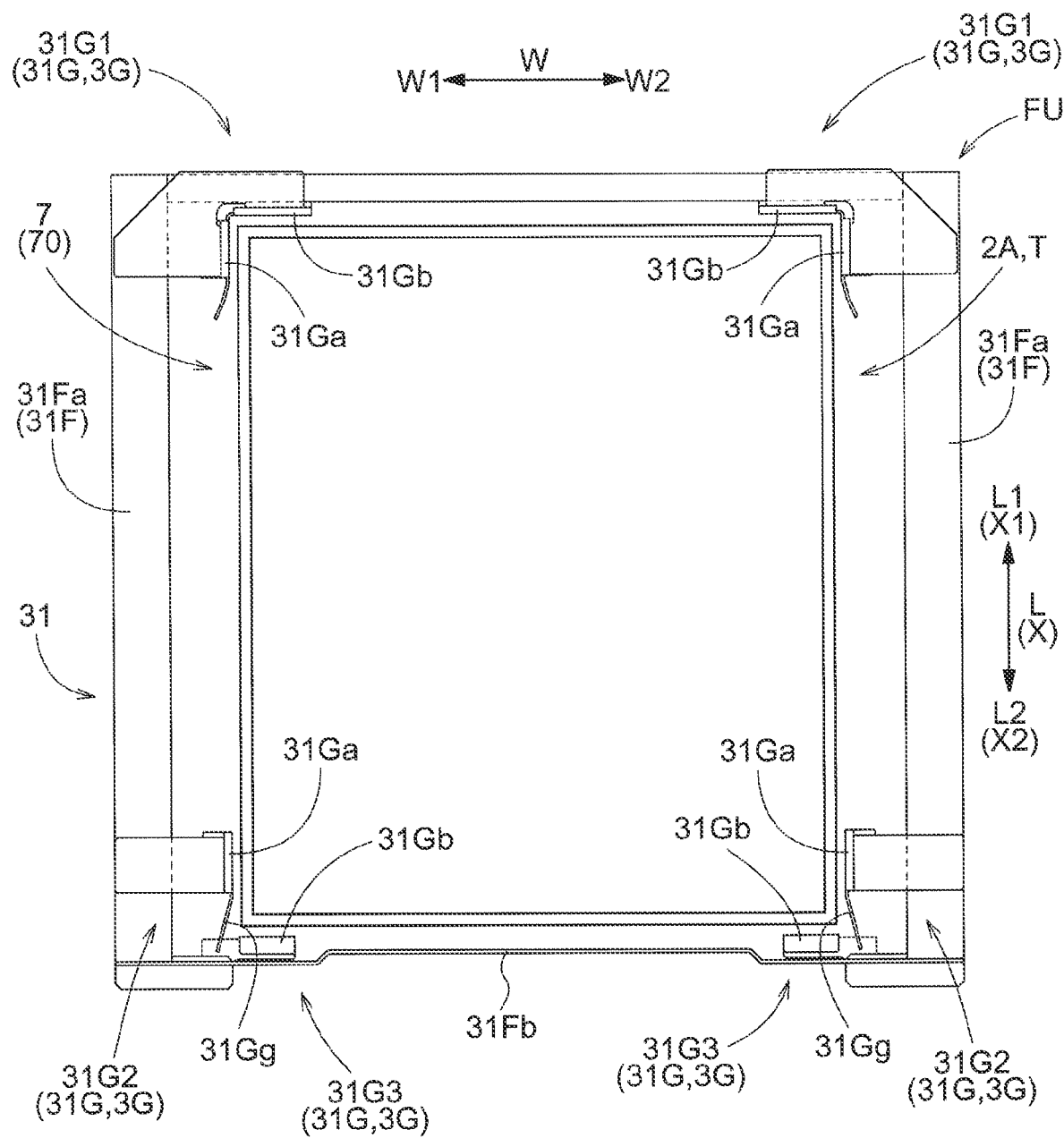
FIG. 18 is a plan view showing the lifting device according to the second embodiment

FIG. 17 is a view of the lifting device 3 in the body length direction L. FIG. 18 is a plan view of the lifting device 3.

As shown in FIGS. 17 and 18, in the present embodiment, the lifting device 3 includes a regulating/guiding section 3G that regulates the inclination of the container group 7 in the stacking region 2A. The regulating/guiding section 3G regulates the inclination of the container group 7 by horizontally opposing the container group 7, separately from the container group support 2 (see FIG. 4, etc.) supporting the container group 7 from below. The regulating/guiding section 3G also has a function of guiding the containers 70 in the transfer direction X, when the transfer device 4 transfers containers 70 with respect to the stacking region 2A.

In the present embodiment, the regulating/guiding section 3G includes a first regulating/guiding section 31G and a second regulating/guiding section 32G disposed lower than the first regulating/guiding section 31G. In the present example, the first regulating/guiding section 31G is provided on the first frame section 31F. Specifically, the first regulating/guiding section 31G is provided on the pair of first frame members 31Fa spaced apart in the body width direction W, and has a portion protruding inward from each first frame member 31Fa in the body width direction W. Also, in the present example, the second regulating/guiding section 32G is provided on the second frame section 32F. Specifically, the second regulating/guiding section 32G is provided on the pair of second frame members 32Fa spaced apart in the body width direction W, and has a portion protruding inward from each second frame member 32Fa in the body width direction W.

As shown in FIG. 18, in the present embodiment, the first frame section 31F includes a width direction frame member 31Fb that is disposed in the body width direction W, in addition to the pair of first frame members 31Fa. In the present example, the width direction frame member 31Fb connects the respective end sections of the pair of first frame members 31Fa on the transfer direction loading side X2. In the present embodiment, the first regulating/guiding section 31G is also provided on the width direction frame member 31Fb, in addition to the pair of first frame members 31Fa. Although not illustrated in detail, the second frame section 32F also similarly includes a width direction frame member. The second regulating/guiding section 32G is also similarly provided on this width direction frame member, in addition to the pair of second frame members 32Fa. That is, in the present example, the first regulating/guiding section 31G and the second regulating/guiding section 32G have similar structures to each other. Hereinafter, the structure of the first regulating/guiding section 31G will be described, and description of the structure of the second regulating/guiding section 32G, being similar thereto, will be omitted.

As shown in FIG. 18, in the present embodiment, the first regulating/guiding section 31G includes a width direction opposing section 31Ga and a length direction opposing section 31Gb that are respectively disposed to oppose the container group 7 in the stacking region 2A in the body width direction W and the body length direction L. If the container group 7 in the stacking region 2A inclines in the body width direction W or the body length direction L, the width direction opposing section 31Ga or the length direction opposing section 31Gb thereby comes in contact with the container group 7 and supports the container group 7 in the body width direction W or the body length direction L. The inclination of the container group 7 can thereby be appropriately regulated. Note that, even if the container group 7 in the stacking region 2A moves in the body width direction W or the body length direction L, the movement of the container group 7 can be appropriately regulated by the width direction opposing section 31Ga or the length direction opposing section 31Gb coming in contact with the container group 7.

In the present embodiment, the first regulating/guiding section 31G includes a first regulating/guiding member 31G1 disposed in correspondence with the portion of the container group 7 on the transfer direction unloading side X1 in the stacking region 2A, a second regulating/guiding member 31G2 disposed in correspondence with the portion of the container group 7 on the transfer direction loading side X2 in the stacking region 2A, and a third regulating/guiding member 31G3 disposed on the transfer direction loading side X2 relative to the container group 7 in the stacking region 2A.

In the present embodiment, the first regulation guide member 31G1 and the second regulating/guiding member 31G2 are connected to each of the pair of first frame members 31Fa. The first regulating/guiding member 31G1 is disposed on the transfer direction unloading side X1 relative to the second regulating/guiding member 31G2. The second regulating/guiding member 31G2 is disposed on the transfer direction loading side X2 relative to the first regulating/guiding member 31G1. The third regulating/guiding member 31G3 is coupled to the width direction frame member 31Fb. In the present example, a pair of third regulating/guiding members 31G3 are coupled to the width direction frame member 31Fb, with an interval therebetween in the body width direction W.

In the present embodiment, the first regulating/guiding member 31G1 includes a width direction opposing section 31Ga and a length direction opposing section 31Gb. The length direction opposing section 31Gb of the first regulating/guiding member 31G1 is disposed to oppose the container group 7 in the stacking region 2A from the transfer direction unloading side X1. In the present example, the width direction opposing section 31Ga is formed in a plate shape that has a surface facing inward in the body width direction W and extends in the transfer direction X. The length direction opposing section 31Gb of the first regulating/guiding member 31G1 is formed in a plate shape that has a surface facing the transfer direction loading side X2 and extends in the body width direction W. The width direction opposing section 31Ga and the length direction opposing section 31Gb of the first regulating/guiding member 31G1 are contiguous and form an L-shape in top-down view. In the illustrated example, the width direction opposing section 31Ga and the length direction opposing section 31Gb both oppose the container group 7 with a gap therebetween. Note that the width direction opposing section 31Ga and the length direction opposing section 31Gb may be disposed to oppose the container group 7 in contact with a side surface thereof.

In the present embodiment, the first regulating/guiding section 31G (second regulating/guiding section 32G) includes a guide section 31Gg that guides the container 70 to be transferred to the stacking region 2A in the transfer direction X, in addition to the width direction opposing section 31Ga and the length direction opposing section 31Gb. Also, the second regulating/guiding member 31G2 includes a guide section 31Gg and a width direction opposing section 31Ga. The guide section 31Gg is formed in a plate shape that moves inward in the body width direction W while extending toward the transfer direction unloading side X1. It is thereby possible to appropriately guide the container 70 to be transferred to the stacking region 2A toward the transfer direction unloading side X1. In the present example, the guide section 31Gg and the width direction opposing section 31Ga of the second regulating/guiding member 31G2 are contiguously formed. The width direction opposing section 31Ga of the second regulating/guiding member 31G2 is formed in a plate shape extending contiguously from the end section of the guide section 31Gg on the transfer direction unloading side X1 toward the transfer direction unloading side X1.

In the present embodiment, the third regulating/guiding member 31G3 includes a length direction opposing section 31Gb. The length direction opposing section 31Gb of the third regulation guide member 31G3 is disposed to oppose the container group 7 in the stacking region 2A from the transfer direction loading side X2. In the present example, the length direction opposing section 31Gb of the third regulation guide member 31G3 is formed in a plate shape that has a surface facing the transfer direction unloading side X1 and extends in the body width direction W.

Here, the width direction opposing sections 31Ga and the length facing sections 31Gb change between an opposing state of supportively opposing the container group 7 in the stacking region 2A horizontally, and a non-opposing state of not opposing the container group 7 horizontally. That is, when the frame unit FU is in a position that does not overlap the container group 7 in the stacked region 2A in horizontal view, as shown by the virtual lines in FIG. 19, the width direction opposing sections 31Ga and the length facing sections 31Gb will be in the non-opposing state. On the other hand, when the frame unit FU is in a position that overlaps the container group 7 in the stacked region 2A in horizontal view, as shown by the solid lines in FIG. 19, the width direction opposing sections 31Ga and the length facing sections 31Gb will be in the opposing state.

In the present embodiment, the controller C (see FIG. 4) is capable of executing container group opposing control for disposing the frame unit FU in a position overlapping the container group 7 in the stacking region 2A in horizontal view. In the container group opposing control, the controller C disposes the frame unit FU in a container group opposing range SR, by elevating the lift elevating body 30B supporting the frame unit FU up and down. Specifically, the controller C executes container group opposing control by controlling the lift elevating body drive section 30M (see FIG. 12, etc.).

Figure 19:
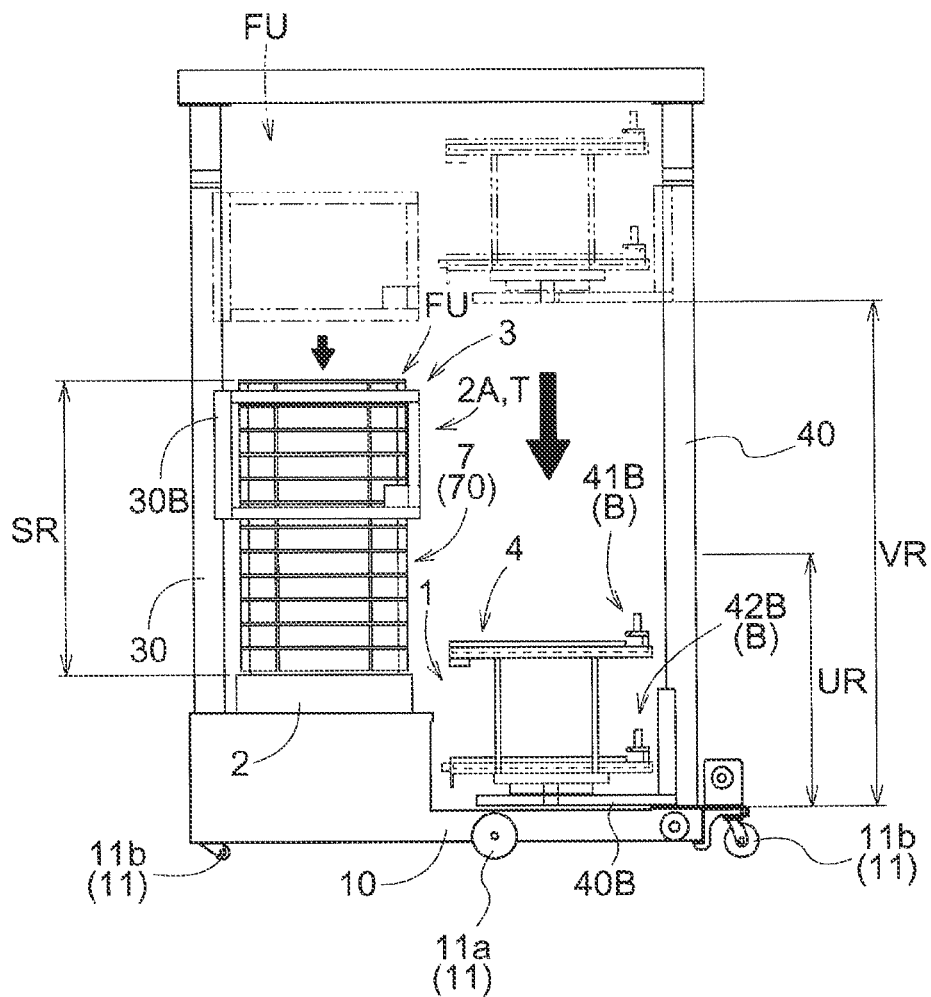
FIG. 19 is an illustrative view showing operations of the lifting device according to container group opposing control in the second embodiment.

Here, the "container group opposing range SR" is a range set vertically, and is set according to the vertical range currently occupied by the container group 7 in the stacking region 2A. The controller C disposes at least part of the frame unit FU in the container group opposing range SR by executing container group opposing control. In the present embodiment, the controller C executes container group opposing control, such that the frame unit FU is disposed to overlap the uppermost container 70 of the plurality of containers 70 constituting the container group 7 in horizontal view. Here, the controller C ensures that the regulating/guiding section 3G is disposed to overlap the uppermost container 70 of the container group 7 in horizontal view. More specifically, in the present example, out of the first regulating/guiding section 31G and the second regulating/guiding section 32G provided on the frame unit FU, the first regulating/guiding section 31G is disposed to overlap the uppermost container 70 of the container group 7 in horizontal view. If the container group 7 inclines, the uppermost container 70 of the plurality of containers 70 constituting the container group 7 can thereby be supported by the regulating/guiding section 3G (width direction opposing sections 31Ga and length direction opposing sections 31Gb), and inclining, collapsing and the like of the container group 7 can be appropriately regulated. Note that, in FIG. 19, illustration of the regulating/guiding section 3G (width direction opposing sections 31Ga and length direction opposing sections 31Gb) is omitted, in order to avoid complexity.

In the present embodiment, the controller C determines whether the travel body 1 is in the rack region IA or the external region OA (see FIG. 2), and executes container group opposing control in at least part of the external region OA. The container group 7 in the stacking region 2A thereby becomes less likely to collapse, when the travel body 1 changes direction with a spin turn or the like in the external region OA, or more specifically, in a direction change region DA.

In the present embodiment, after completing the transfer of containers 70 at the last transfer stop position SP (see FIG. 15) before entering the external region OA from the rack region IA along the travel path R of the travel body 1, the controller C starts container group opposing control before the travel body 1 enters the external region OA. The controller C then keeps executing the container group opposing control while the travel body 1 is in the external region OA. In the present example, in the case of the transfer device 4 performing the next transfer of containers 70, the controller C keeps executing the container group opposing control after the travel body 1 has entered the external region OA for the duration that the travel body 1 is in the external region OA, and until the next transfer is executed after the travel body 1 enters the rack region IA.

In the present embodiment, the controller C executes the container group opposing control at the same time as the center-of-gravity reduction control. The transport vehicle 100 can thereby be inhibited from tipping over, and the container group 7 can also be inhibited from collapsing.

Next, the processing procedure in the case of executing the container group opposing control will be described with reference to the flowchart in FIG. 20.

Figure 20:
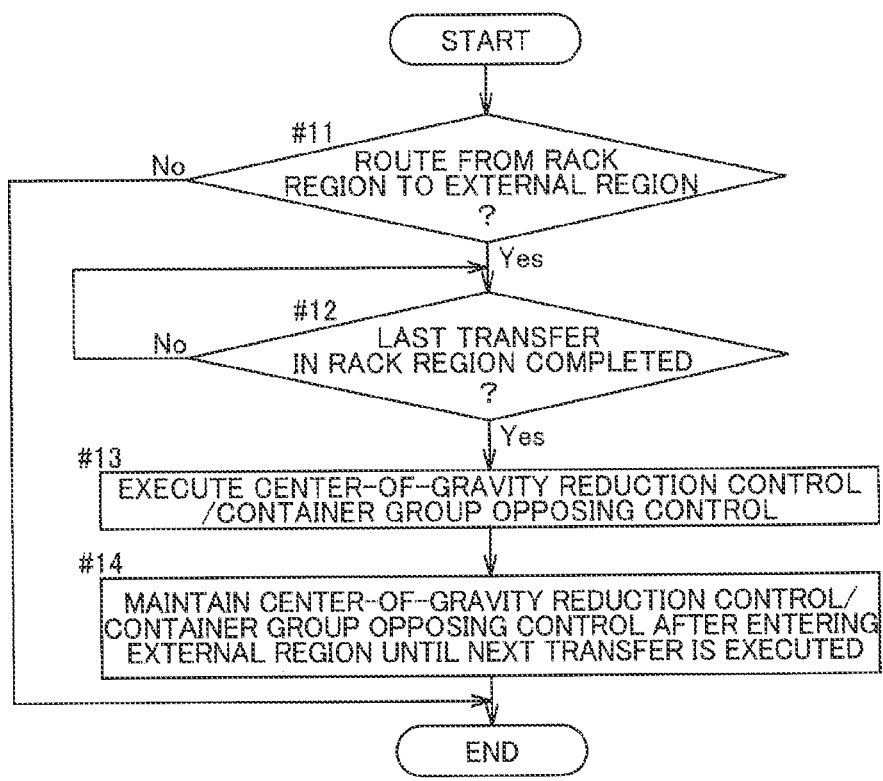
FIG. 20 is a flowchart showing a processing procedure in the case of executing container group opposing control in the second embodiment.

As shown in FIG. 20, the controller C determines whether the route that the travel body 1 is currently traveling on is a route from the rack region IA to the external region OA (step #11). The route that the travel body 1 takes is included in a transport instruction that is transmitted from the host controller H, for example. In this case, the controller C performs determination of the route, based on this transport instruction.

If it is determined that the route that the travel body 1 is currently traveling on is not a route from the rack region IA to the external region OA (step #11: No), the controller C ends the routine. If it is determined that the route that the travel body 1 is currently traveling on is a route from the rack region IA to the external region OA (step #11: Yes), the controller C determines whether the last transfer in the rack region IA has been completed (step #12).

If it is determined that the last transfer in the rack region IA has not been completed (step #12: No), the controller C repeats the processing of step #12. If it is determined that the last transfer in the rack region IA has been completed (step #12: Yes), the controller C executes the center-of-gravity reduction control and the container group opposing control (step #13). The controller C then keeps executing the center-of-gravity reduction control and the container group opposing control until the transfer device 4 performs the next transfer of containers 70 after the travel body 1 has left the external region OA and entered the rack region IA (step #14).

Other Embodiments

Next, other embodiments of the transport vehicle will be described.

(1) In the above embodiment, the lifting device 3 and the transfer device 4 are illustrated as functional sections F. However, the present disclosure is not limited to such an example, and other devices apart from the lifting device 3 and the transfer device 4 may serve as functional sections F.

(2) In the above embodiment, the lift elevating body drive section 30M is illustrated as the first drive source, and the transfer elevating body drive section 40M is illustrated as the second drive source. However, the present disclosure is not limited to such an example, and various drive sections for driving a functional section F may serve as the first drive source. Similarly, various drive sections for a driving functional section F different from the above functional section F may serve as the second drive source.

(3) In the above embodiment, an example is described in which the distance by which the lift elevating body drive section 30M is separated from the width direction reference line LW in the body length direction L is equivalent to the distance by which the transfer elevating body drive section 40M is separated from the width direction reference line LW in the body length direction L, and the distance by which the lift elevating body drive section 30M is separated from the length direction reference line LL in the body width direction W is equivalent to the distance by which the transfer elevating body drive section 40M is separated from the length direction reference line LL in the body width direction W. However, the present disclosure is not limited to such an example, and the above distances need only be values that takes into consideration the weight balance of the entire travel body 1, and can be set as appropriate according to the difference in weight between the lift elevating body drive section 30M and the transfer elevating body drive section 40M.

(4) In the above embodiment, an example is described in which the lift elevating body drive section 30M is disposed to at least partially overlap the container group support 2 in top-down view. However, the present disclosure is not limited to such an example, and the lift elevating body drive section 30M may be disposed to entirely not overlap the container group support 2 in top-down view.

(5) In the above embodiment, an example is described in which the transfer elevating body drive section 40M is disposed to not overlap the transfer device 4 in top-down view. However, the present disclosure is not limited to such an example, and the transfer elevating body drive section 40M may be disposed to at least partially overlap the transfer device 4 in top-down view.

(6) In the above embodiment, an example is described in which the controller C is disposed on the first side L1 in the body length direction relative to the width direction reference line LW in top-down view. However, the present disclosure is not limited to such an example, and part of the controller C may be disposed on the first side L1 in the body length direction relative to the width direction reference line LW in top-down view, and the remaining part of the controller C may be disposed on the second side L2 in the body length direction relative to the width direction reference line LW in top-down view. Alternatively, the controller C may be entirely disposed on the second side L2 in the body length direction relative to the width direction reference line LW in top-down view.

(7) In the above embodiment, an example is described in which the power storage device Cb is disposed on the first side L1 in the body length direction relative to the width direction reference line LW in top-down view. However, the present disclosure is not limited to such an example, and part of the power storage device Cb may be disposed on the first side L1 in the body length direction relative to the width direction reference line LW in top-down view, and the remaining part of the power storage device Cb may be disposed on the second side L2 in the body length direction relative to the width direction reference line LW in top-down view. Alternatively, the power storage device Cb may be entirely disposed on the second side L2 in the body length direction relative to the width direction reference line LW in top-down view.

(8) In the above embodiment, an example is described in which the controller C executes the container group opposing control at the same time as the center-of-gravity reduction control. However, the present disclosure is not limited to such an example, and the controller C may execute the container group opposing control at a different time from the center-of-gravity reduction control. Also, the controller C may execute only one of the center-of-gravity reduction control and the container group opposing control, or may execute neither of these controls.

(9) In the above embodiment, an example is described in which each of the pair of drive wheels 11a are independently driven by different wheel drive sources 11M. However, the present disclosure is not limited to such an example, and the pair of drive wheels 11a may be coupled by a gear mechanism or the like to rotate at identical speeds or different speeds, and be driven by one wheel drive source 11M.

(10) In the above embodiment, an example is described in which the pair of wheel drive sources 11M are disposed in the middle region 10Am of the travel body section 10. However, the pair of wheel drive sources 11M may be disposed in a region other than the middle region 10Am in the travel body section 10.

(11) In the above embodiment, an example is described in which the position information acquisition section Ca acquires position information of the travel body 1 transmitted from the host controller H that manages the entire facility. However, the present disclosure is not limited to such an example, and, for example, the position information acquisition section Ca may, by reading information indicating the position of an information storage section (not shown) provided on a boundary between the rack region IA and the external region OA from the information storage section, acquire the current position information of the travel body 1 at the boundary. An information storage medium such as a bar code or an IC tag may serve as the information storage section in this case. Alternatively, the position information acquisition section Ca may be configured by a camera, and acquire the current position information of the travel body 1 based on images of the surroundings of the travel body 1 captured by the camera.

(12) The configuration disclosed in the above-described embodiment can also be applied in combination with configurations disclosed in the other embodiments provided no inconsistencies arise. As for other configurations, the embodiments disclosed herein are merely illustrative in all respects. Accordingly, various modifications can be made as appropriate within a range that does not depart from the spirit of the present disclosure.

Summary of Embodiments

Hereinafter, the transport vehicle illustrated above will be described.

A transport vehicle for transporting an article in a supported state and transferring the article to a transfer target location includes:
  a travel body configured to travel;
  a functional section configured to support and transfer the article; and
  a first drive source and a second drive source configured to drive the functional section,
  wherein the travel body includes:
  a travel body section;
  a pair of drive wheels supported by the travel body section; and
  a wheel drive source configured to drive the pair of drive wheels,
  the pair of drive wheels are drivable by the wheel drive source to rotate at identical speeds or different speeds to each other,
  the pair of drive wheels are disposed in a middle region of the travel body section in a length direction of a body of the transport vehicle that is a direction in which the travel body travels, and are separated from each other in a width direction of the body that is a direction intersecting the length direction of the body in top-down view extending vertically,
  the first drive source is disposed, in top-down view, on a first side in the length direction of the body relative to a width direction reference line and on a first side in the width direction of the body relative to a length direction reference line, the first side in the length direction of the body being one side in the length direction of the body, and the first side in the width direction of the body being one side in the width direction of the body, and the second drive source is disposed, in top-down view, on a second side in the length direction of the body relative to the width direction reference line and on a second side in the width direction of the body relative to the length direction reference line, the second side in the length direction of the body being another side in the length direction of the body, and the second side in the width direction of the body being another side in the width direction of the body, the width direction reference line being a virtual line extending in the width direction of the body to connect the pair of drive wheels in top-down view, and the length direction reference line being a virtual line intersecting the width direction reference line in top-down view at an intermediate position between the pair of drive wheels in the width direction of the body and extending in the length direction of the body.

According to this configuration, a so-called spin turn in which the travel body is made to turn on the spot can be performed by rotating the pair of drive wheels in opposite directions to each other. However, when such a spin turn is performed, the behavior of the transport vehicle may be destabilized, if the center of gravity of the transport vehicle is greatly biased in the body length direction and the body width direction. Here, the point where the length direction reference line intersects the width direction reference line in top-down view roughly coincides with the turning center that the travel body turns around when the transport vehicle performs a spin turn. According to this configuration, the first drive source and the second drive source, which tend to be heavy loads, are disposed diagonally in top-down view, with respect to the turning center of the travel body. Thus, ensuring that the center of gravity of the transport vehicle is not greatly biased in the body length direction and the body width direction is facilitated. Accordingly, with this configuration, it becomes possible to stabilize the behavior of the transport vehicle when performing a turn including a spin turn.

Here, it is preferable that the wheel drive source is disposed in the middle region of the travel body section in the length direction of the body.

According to this configuration, the wheel drive source can be disposed closer to the turning center that the travel body turns around when the transport vehicle performs a spin turn, thus making it possible to further stabilize the behavior of the transport vehicle when performing a turn including a spin turn.

Also, it is preferable that the article is a container in which an item for storage is storable, the transport vehicle further includes:
a container group support mounted on the travel body, and configured to support a plurality of the containers in a prescribed stacking region as a container group in a stacked state; and
a lifting device, as the functional section, mounted on the travel body and configured to lift the containers of the container group supported by the container group support, and
the first drive source is a drive source of the lifting device, and at least partially overlaps the container group support in top-down view.

According to this configuration, the first drive source and the lifting device to be driven by the first drive source can be disposed closer to each other, thus facilitating transmission of the drive force from the drive source to the drive target.

Also, it is preferable that the above configuration further includes:
a transfer device, as the functional section, mounted on the travel body and configured to transfer the containers, and
the second drive source is a drive source of the transfer device, and does not overlap the transfer device in top-down view.

According to this configuration, the operations of the transfer device are not susceptible to being restricted by the presence of the second drive source. For example, in the case where the transfer device has a function of elevating the containers up and down, it becomes possible to secure a wide elevation range of the containers.

Also, it is preferable that the above configuration further includes:
a controller configured to control the travel body, the lifting device and the transfer device, and
the controller is disposed lower than the container group support, and on the first side in the length direction of the body relative to the width direction reference line in top-down view.

The position of the center of gravity of the transport vehicle changes with an increase or decrease in the number of containers constituting the container group supported in the stacking region. According to this configuration, the controller, which tends to be a heavy load, can be disposed at a position overlapping, in top-down view, the stacking region where the containers are stacked or at a position close thereto. Thus, even if there is an increase or decrease in the number of containers constituting the container group, the amount of change in the position of the center of gravity of the transport vehicle can be kept low.

Also, it is preferable that the above configuration further includes:
a power storage device configured to supply power to the wheel drive source, the first drive source and the second drive source, and
the power storage device is disposed lower than the container group support, and on the first side in the length direction of the body relative to the width direction reference line in top-down view.

The position of the center of gravity of the transport vehicle changes with an increase or decrease in the number of containers constituting the container group supported in the stacking region. According to this configuration, the power storage device, which tends to be a heavy load, can be disposed at a position overlapping, in top-down view, the stacking region where the containers are stacked or at a position close thereto. Thus, even if there is an increase or decrease in the number of containers constituting the container group, the amount of change in the position of the center of gravity of the transport vehicle can be kept low.

Also, it is preferable that the first drive source and the second drive source are disposed lower than the container group support.

According to this configuration, the position of the center of gravity of the transport vehicle can be lowered, thus making it possible to further stabilize the behavior of the transport vehicle when performing a turn including a spin turn.

The technology according to the present disclosure can be utilized in a transport vehicle that transports articles in a supported state and transfers the articles to a transfer target location.

What is claimed is:

1. A transport vehicle for transporting an article in a supported state and transferring the article to a transfer target location, comprising:
   a travel body;
   a first functional section and a second functional section configured to support and transfer the article, a function of the first functional section being different from a function of the second functional section; and
   a first drive source configured to drive the first functional section and a second drive source configured to drive the second functional section,
   wherein:
   the travel body comprises:
      a travel body section;
      a pair of drive wheels supported by the travel body section; and
      a wheel drive source configured to drive the pair of drive wheels,
   the pair of drive wheels are drivable by the wheel drive source to rotate at identical speeds or different speeds to each other,
   the pair of drive wheels are disposed in a middle region of the travel body section in a length direction of a body of the transport vehicle that is a direction in which the travel body travels, and are separated from each other in a width direction of the body that is a direction intersecting the length direction of the body in top-down view extending vertically,
   the first drive source is disposed, in top-down view, on a first side in the length direction of the body relative to a width direction reference line and on a first side in the width direction of the body relative to a length direction reference line, the first side in the length direction of the body is one side in the length direction of the body, and the first side in the width direction of the body is one side in the width direction of the body, and
   the second drive source is disposed, in top-down view, on a second side in the length direction of the body relative to the width direction reference line and on a second side in the width direction of the body relative to the length direction reference line, the second side in the length direction of the body is another side in the length direction of the body, and the second side in the width direction of the body is another side in the width direction of the body,
   the width direction reference line is a virtual line extending in the width direction of the body to connect the pair of drive wheels in top-down view, and the length direction reference line is a virtual line intersecting the width direction reference line in top-down view at an intermediate position between the pair of drive wheels in the width direction of the body and extending in the length direction of the body.

2. The transport vehicle according to claim 1, wherein the wheel drive source is disposed in the middle region of the travel body section in the length direction of the body.

3. The transport vehicle according to claim 1, wherein the article is a container in which an item for storage is storable, wherein the transport vehicle further comprises:
   a container group support mounted on the travel body, and configured to support a plurality of the containers in a prescribed stacking region as a container group in a stacked state; and
   a lifting device, as the first functional section, mounted on the travel body and configured to lift the containers of the container group supported by the container group support, and
   the first drive source is a drive source of the lifting device, and at least partially overlaps the container group support in top-down view.

4. The transport vehicle according to claim 3, further comprising:
   a transfer device, as the second functional section, mounted on the travel body and configured to transfer the containers,
   wherein the second drive source is a drive source of the transfer device, and does not overlap the transfer device in top-down view.

5. The transport vehicle according to claim 4, further comprising:
   a controller configured to control the travel body, the lifting device and the transfer device,
   wherein the controller is disposed lower than the container group support, and on the first side in the length direction of the body relative to the width direction reference line in top-down view.

6. The transport vehicle according to claim 4, further comprising:
   a power storage device configured to supply power to the wheel drive source, the first drive source and the second drive source,
   wherein the power storage device is disposed lower than the container group support, and on the first side in the length direction of the body relative to the width direction reference line in top-down view.

7. The transport vehicle according to claim 4, wherein the first drive source and the second drive source are disposed lower than the container group support.

8. The transport vehicle according to claim 1, further comprising:
   a transfer device, as the second functional section, mounted on the travel body and configured to transfer the article,
   wherein the second drive source is a drive source of the transfer device.

9. The transport vehicle according to claim 8, wherein the transfer device is configured to transfer the article to the transfer target location.

10. The transport vehicle according to claim 8, wherein the transfer device is configured to perform an unloading operation for transferring the article to the transfer target location and a loading operation for transferring the article from the transfer target location.

11. The transport vehicle according to claim 9, further comprising:
    a turning device that turns the transfer device around an axis extending vertically.

* * * * *